United States Patent

[11] 3,587,058

[72] Inventors Thomas T. Butler
Downers Grove;
Kenneth P. Kretsch, Sr., Wheaton;
Sylvester M. Neville, Naperville; George W. Smith, Jr., Naperville, all of, Ill.

[21] Appl. No. 830,343
[22] Filed June 4, 1969
[45] Patented June 22, 1971
[73] Assignee Bell Telephone Laboratories, Incorporated
Murray Hill, Berkeley Heights, N.J.

[54] DATA PROCESSING SYSTEM INPUT-OUTPUT ARRANGEMENT
20 Claims, 15 Drawing Figs.

[52] U.S. Cl. .......... 340/172.5
[51] Int. Cl. .......... G06f 3/00
[50] Field of Search .......... 340/172.5; 235/157

[56] References Cited

UNITED STATES PATENTS 3,099,818 7/1963 Murray .......... 340/172.5
3,311,889 3/1967 Birmingham et al. .......... 340/172.5
3,362,015 1/1968 Mackle et al. .......... 340/172.5
3,378,820 4/1968 Smith .......... 340/172.5
3,406,380 10/1968 Bradley et al. .......... 340/172.5
3,413,613 11/1968 Bahrs et al. .......... 340/172.5
3,417,374 12/1968 Pariser .......... 340/172.5

*Primary Examiner*—Raulfe B. Zache
*Attorneys*—R. J. Guenther and R. B. Ardis

ABSTRACT: A store and forward message switching system in which an auxiliary processor is employed to communicate with data lines having various data rates and data formats, and with disc and tape bulk data storage units. The data lines are terminated on data line buffers which are serviced by cooperation of two control circuits in the auxiliary processor operating on an overlap basis. Data is transferred between a fast access memory and the bulk data storage units under control of sequencing circuits in the auxiliary processor, and the function of servicing data line buffers is performed contemporaneously with the function of transferring data between the fast access memory and the bulk data storage units.

INVENTORS T. T. BUTLER
K. P. KRETSCH SR.
S. M. NEVILLE
G. W. SMITH JR.

BY John C Albrecht
ATTORNEY

PATENTED JUN 22 1971 3,587,058

SHEET 08 OF 14

DATA PROCESSING SYSTEM INPUT-OUTPUT ARRANGEMENT

BACKGROUND OF THE INVENTION

In a store and forward message switching system messages are received from data lines, stored in the system in bulk data storage units (e.g., disc and tape), and subsequently transmitted to destinations identified by address information accompanying the messages. Since large amounts of data must be handled on a real time basis, and a variety of operations (e.g., preparation of message headings, code conversion, error control, etc.) must be performed, an efficient data processing system is essential. To increase system efficiency, data lines are frequently terminated on autonomously operating data line buffers. The buffers convert system input data from the serial form, in which the data is received from the data lines, into the parallel form, which is employed within the message switching system, convert system output data from the parallel to the serial form for transmission on the data lines, and generate line status and identification information. A data processor services the data line buffers on a regular basis by obtaining line status and identification information and system input data from the buffers and by supplying system output data to the buffers. Furthermore, the data processor assembles input data from each data line, transfers assembled input messages to bulk data storage units, obtains output messages from bulk data storage units, and prepares the output messages for transmission to specified destinations. The tasks of servicing the data line buffers and of transferring data to and from bulk storage units are routine tasks which may consume a great deal of processor real time.

Accordingly, it is an object of this invention to provide a data processor for a message switching system wherein communications with data line buffers and bulk data storage units consume a minimum of processor real time.

It is another object of this invention to provide a means for performing the functions of obtaining line status information and input data from data line buffers and of processing input data and transmitting output data to data line buffers on an overlap basis.

It is another object of this invention to provide an input-output processor for servicing data lines, and for transferring data to and from bulk storage units contemporaneously therewith.

SUMMARY OF THE INVENTION

In accordance with this invention, a data processor comprises two control circuits which function cooperatively on an overlap basis to service data line buffers terminating data lines having various data rates and data formats. The first of the two control circuits generates and transmits address information to the data line buffers to obtain line status and identification information and input data therefrom; the second control circuit stores input data in a fast access memory and obtains output data from the fast access memory and transmits the output data to the data line buffers in accordance with line status and identification information obtained by the first control circuit. A priority circuit resolves conflicts between the two circuits by allocating access to a communication bus interconnecting the data line buffers and the data processor, on a priority basis. Cooperation between the two circuits is assured by means of flip-flops and registers which are accessible to both control circuits. The first control circuit stores line status and identification information and system input data in the flip-flops and registers; the second control circuit obtains this information therefrom. The first control circuit is prevented from disturbing the state of the flip-flops and registers until the information is removed therefrom by the second control circuit. Independently operating sequencing circuits transfer data blocks between the fast access memory and bulk data storage units such as disc and tape. An access control circuit is provided to allocate access to the fast access memory, to the several autonomously operating circuits of the data processor, in accordance with a predetermined priority plan.

In accordance with one feature of this invention, servicing of data line buffers in a data switching system is accomplished by the cooperation of two control circuits operating contemporaneously and on an overlap basis.

In accordance with another feature of this invention, a first control circuit obtains line status and identification information and system input data from data line buffers and a second control circuit processes input data and transmits output data to data line buffers.

In accordance with another feature of this invention, the function of servicing data line buffers is performed contemporaneously with communication with bulk data storage units.

GENERAL DESCRIPTION

Figure 1:
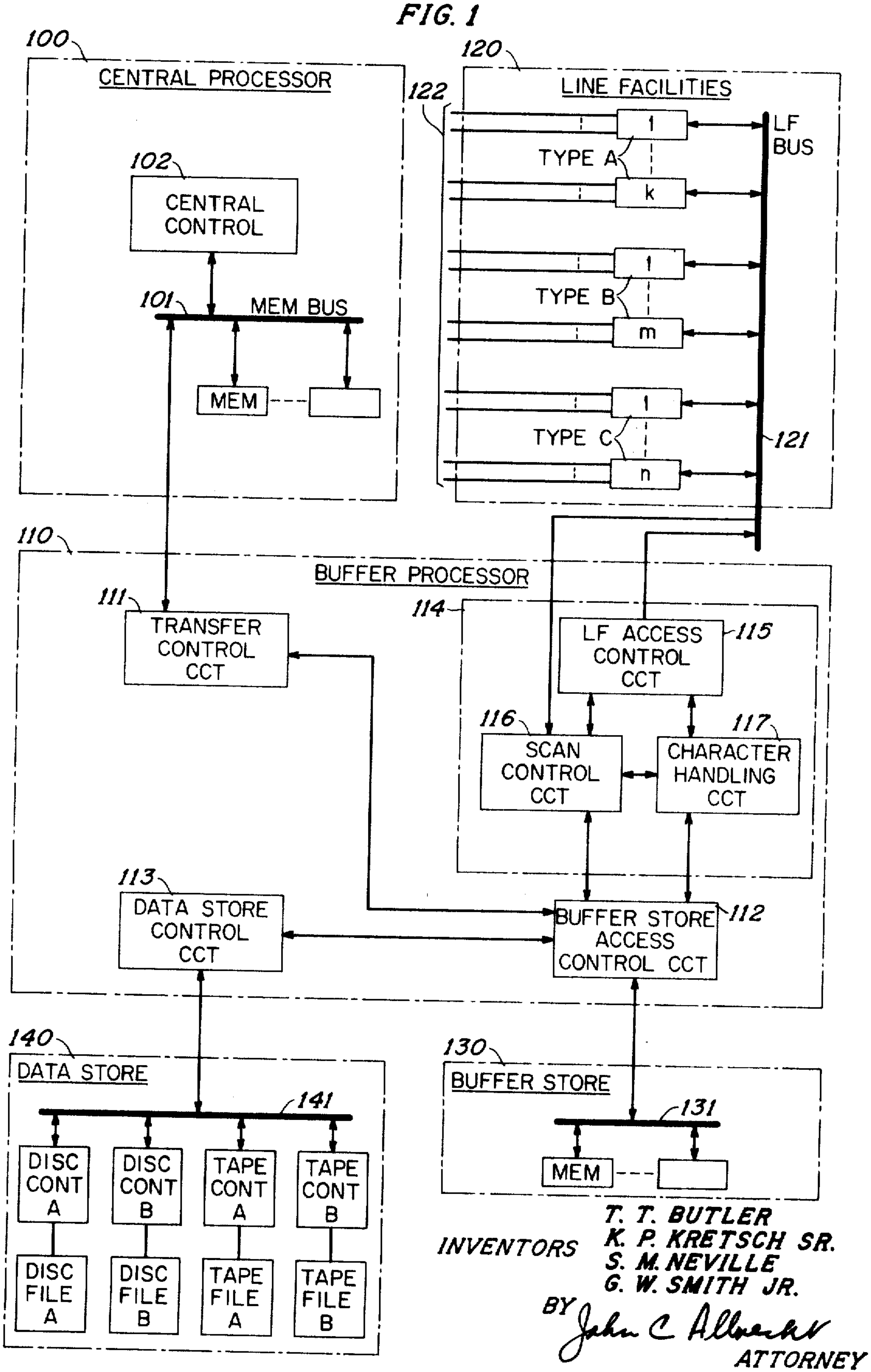
FIG. 1 is an illustrative block diagram of a message switching system.

The illustrative embodiment of our invention is a store and forward message switching system, as shown in FIG. 1, comprising a Central Processor 100, a Buffer Processor 110, Line Facilities 120 comprising three types of data line buffers (Type A, Type B, and Type C) on which data lines having various data rates and data formats are terminated, a fast access Buffer Store 130, and a Data Store 140 comprising bulk data storage units. The line Facilities 120, the Buffer Store 130, and the Data Store 140 are accessed by the Buffer Processor 110 which has a plurality of independently operating control circuits dedicated to the performance of predetermined functions. One such control circuit is the Transfer Control Circuit 111 which is responsive to command signals from the Central Processor 100 to store information received from the Central Processor 100 in the Buffer Store 130 and to fetch data from the Buffer Store 130 and to transmit the fetched data to the Central Processor 100. The Scan Control Circuit 116 and the Character Handling Circuit 117 function cooperatively to transfer system input data and system output data between the Line Facilities 120 and the Buffer Store 130. The Data Store Control Circuit 113 transfers data between the Data Store 140 and the Buffer Store 130. Access to the Buffer Store 130 by each of the control circuits (111, 113, 116, 117) is allocated upon request, by the Buffer Store Access Control Circuit 112, in accordance with a predetermined priority plan. Similarly, the Line Facilities Access Control Circuit 115 allocates access to the Line Facilities 120 upon request from the Scan Control Circuit 116 and the Character Handling Circuit 117.

The data line buffers of the Line Facilities 120 are autonomously operating character assembly-disassembly units each terminating a plurality of data lines. These buffers assemble serial data streams received from the data lines into multibit input data characters, and disassemble multibit output data characters into serial data streams for transmission on the data lines. The data line buffers are interconnected with the Buffer Processor 110 by means of the Line Facilities Bus 121, on which the Buffer Processor 110 transmits address information and system output data, and from which it receives line status and identification information and input data. Each data line buffer has facilities for recognizing a predetermined address appearing on the Line Facilities Bus 121 and for responding to that address either by accepting output data from the bus or by transmitting line status and identification information and system input data on the bus.

Addresses for the data line buffers are generated by the Scan Control Circuit 116 and transmitted to the buffers with a frequency determined by hardware timing counters in the Scan Control Circuit 116 and control words stored in the Buffer Store 130. The Scan Control Circuit 116 is arranged to operate in one of three modes: the HIGH PRIORITY mode, the INTERMEDIATE PRIORITY mode, and the NORMAL mode. Only specified types of buffers (Type A, B, or C), selected on the basis of the data rates of the lines terminated thereon, are serviced in each mode. The frequency with which these modes are entered to service a particular type buffer is determined by hardware timing counters (i.e., a 1.25 millisecond timing counter and a 50 millisecond timing counter). The particular buffers to be serviced in each mode are specified by the control words. Data buffer addresses are generated in each mode, on the basis of the information contained in the control words, and are transmitted on the Line Facilities Bus 121 to obtain line status and identification information and system input data from the specified buffers. System input data characters, received from the buffers in response to an address transmitted by the Scan Control Circuit 116, are processed by the Character Handling Circuit 117 which assembles the input data characters into multicharacter words and stores them in the Buffer Store 130. When system output data is to be transmitted to a certain buffer, the Character Handling Circuit 117 obtains the output data from the Buffer Store 130 and transmits the output data, and address information identifying the buffer, on the Line Facilities Bus 121.

Communications between the scan Control Circuit 116 and the Character Handling Circuit 117 take place by means of service request, input-output, and buffer type (i.e., A, B, or C) flip-flops and data and address registers in the Scan Control Circuit 116. When line status information obtained from a data line buffer indicates that a particular line is ready for input service, the Scan Control Circuit 116 obtains the input data from the data line buffer, stores the data in the data register, sets the input-output flip-flop, and adjusts the buffer type flip-flops. Additionally, the address of the buffer and a line number identifying the line from which the input data was received, are stored in the address register. Similarly, when line status information obtained from a data buffer indicates that a particular line is ready for output service, the Scan Control Circuit 116 places the appropriate buffer address and line number in the address register, adjusts the buffer type flip-flops and resets the input-output flip-flop. Finally, the Scan Control Circuit 116 signals the Character Handling Circuit 117 by setting the service request flip-flop. The Scan Control Circuit 116 is then prevented from disturbing the state of the flip-flops and the address and data registers as long as the service request flip-flop remains in the set state. The Character Handling Circuit 117 responds to the state of the service request flip-flop by recording the information contained in the input-output flip-flop and the address and data registers, in flip-flops and registers of the Character Handling Circuit 117, and by resetting the service request flip-flop. After the service request flip-flop has been reset, the Scan Control Circuit 116 is free to insert new information in the address and data registers and to adjust the input-output and buffer-type flip-flops. If more lines are found needing service, the service request flip-flop is set once again. It remains in the set state until the previous task has been completed by the Character Handling Circuit 117 and the new information has been obtained from the registers and flip-flops. In this manner, the Scan Control Circuit 116 and the Character Handling Circuit 117 function cooperatively on an overlap basis, and each performs a predetermined part of the total function of servicing data line buffers.

The Data Store 140 comprises two disc controllers and two tape controllers, each having corresponding disc or tape files. The four controllers are interconnected with the Buffer Processor 110 via the Data Store Bus 141. The Data Store Control Circuit 113 in the Buffer Processor 110 comprises four independently operating sequencing circuits each designed to control the transfer of data between the Buffer Store 130 and a predetermined one of the four controllers of the Data Store 140. An instruction queue, stored in the Buffer Store 130, is uniquely associated with each of the four sequencing circuits and contains: information defining tasks to be performed by the associated sequencing circuit; addresses of data word locations in the Buffer Store 130; and disc or tape file data area identification. Each of the sequencing circuits operates autonomously to read its associated queue and to execute the tasks defined therein. When the task is to transfer data from the Buffer Store 130 to the associated disc or tape controller, the data area identification information is first transmitted to the associated controller. Thereafter the data words are obtained from the designated data word locations in the Buffer Store 130 by the sequencing circuit. Each such obtained data word is temporarily stored in a dedicated register in the Data Store Control Circuit 113 and is subsequently transmitted to the associated controller. Similarly, when the task is to transfer data from the associated controller to the Buffer Store 130, the data area identification information is first transmitted to the controller. Thereafter the data is obtained from the controller by the sequencing circuit, is temporarily stored in the dedicated register, and is subsequently stored in the Buffer Store 130. The Data Store Control Circuit 113 further comprises a priority and control circuit for allocating, to each of the four sequencing circuits, access to the Data Store Bus 141 interconnecting the Buffer Processor 110 and the controllers of the Data Store 140, in accordance with a defined priority plan.

DETAILED DESCRIPTION

The various circuits of the Buffer Processor 110 are depicted in greater detail in FIGS. 2 through 9. The processor is a synchronously operating machine comprising a Clock Circuit 500 which generates a plurality of clock pulses each having a duration of a predetermined portion of a basic 5.5 microsecond machine cycle. The clock pulses are each generated once during each machine cycle and are employed throughout the processor in the generation of control pulses.

The Buffer Store Access Control Circuit 112 and the Line Facilities Access Control Circuit 115 grant access to the Buffer Store Bus 131 and the Line Facilities Bus 121, respectively, in accordance with a predetermined priority plan. These circuits comprise priority and control circuits for selecting the circuit which must be granted access and for controlling the transmission of the addresses and the transmission and receipt of data. The Transfer Control Circuit 111, the Data Store Control Circuit 113, the Scan Control Circuit 116, and the Character Handling Circuit 117 are each arranged to request access to the Buffer Store 130 from the Buffer Store Access Control Circuit 112 which grants access on a priority basis in the above order.

Having requested access, the requesting circuit halts all further operations until a signal is received from a Buffer Store Access Control Circuit 112 indicating that access has been granted. In response to such signal, the circuit which has been granted access gates address information, which includes a read or write command, to the Buffer Store Control Bus 512. The address information is subsequently gated from the Buffer Store Control Bus to the Buffer Store 130 via AND gate 701 under control of the Priority and Control Circuit 710. As a general rule, data to be written into the Buffer Store 130 is gated to the BR Register 511 under control of the circuit which was granted access, and to the Buffer Store 130 via the Buffer Store Write Bus 702 under control of the Priority and Control Circuit 710. An exception to this rule is data from the Transfer Control Circuit 111. Such data is transmitted directly to the Buffer Store Write Bus 702 without going through the BR Register 511. Data read from the Buffer Store 130 is generally first gated into the BR Register 511, via AND gate 516, under control of the Priority and Control Circuit 710, and is subsequently obtained therefrom under control of the circuit to which access was granted. However, data read from the Buffer Store 130 intended for the Transfer Control Circuit 111 is received in the DR Register 535 without going through the BR Register 511. Under certain conditions, data intended for the Character Handling Circuit 117 is received in the WR Register 603 without going through the BR Register 511.

The Scan Control Circuit 116 and the Character Handling Circuit 117 are also arranged to request access to the Line Facilities 120 from the Line Facilities Access Control Circuit 115; the Character Handling Circuit 117 having the higher priority. The circuit to which access is granted gates address information to the Line Facilities Control Bus 411. The priority and Control Circuit 413 subsequently gates the address information to the Line Facilities Bus 121 via AND gate 414. When the Character Handling Circuit 117 is granted access, the data contained in the CR Register 602 is gated to the Line Facilities Bus 121 via AND gate 415 under control of the Priority and Control Circuit 413. When the scan control circuit is granted access, the information received in response to the transmitted address is gated into either the IR Register 402 or the FR Register 222, depending upon the type of information which is received.

LINE FACILITIES 120

The Line Facilities 120 comprise three types of data line buffers (Types A, B, and C) to accommodate lines having various data rates. Each Type A buffer unit is arranged to accommodate up to 512 data lines having data rates ranging from 60 to 150 words per minute, and each unit has storage space for six data characters per line as follows: one assembled data character, one data character in the state of being assembled, one data character in the state of being disassembled, and three data characters ready for disassembly. Each Type B buffer unit is arranged to accommodate up to 64 lines having data rates up to 2400 bits per second, and can store four data characters per line as follows: an input data character being assembled, a completed input character, an output character being disassembled, and an output character awaiting disassembly. Each Type C buffer unit is arranged to accommodate 16 interoffice data lines having a data rate of 2400 bits per second and having a 23-bit data word format. Each such unit has facility to store four data words per line as follows: an input data word being assembled, a completed input word, an output word being disassembled, and an output word ready for disassembly.

As mentioned earlier, each data line buffer has facilities for recognizing a predetermined address appearing on the Line Facilities Bus 121. Simultaneously with the address, the Buffer Processor 110 also transmits commands on the Line Facilities Bus 121 which define the action expected of the addressed buffer. There are four such commands, namely, SCAN-I, SCAN-O, SCAN-D, and DATA. An addressed buffer transmits: status and line identification information of input lines in response to the SCAN-I command, status and line identification information of output lines in response to the SCAN-O command, and received system input data in response to the SCAN-D command. An addressed buffer accepts system output data transmitted, on the Line Facilities Bus 121 by the Buffer Processor 110, in response to the DATA command.

scan CONTROL CIRCUIT 116 SCAN

Figure 2:
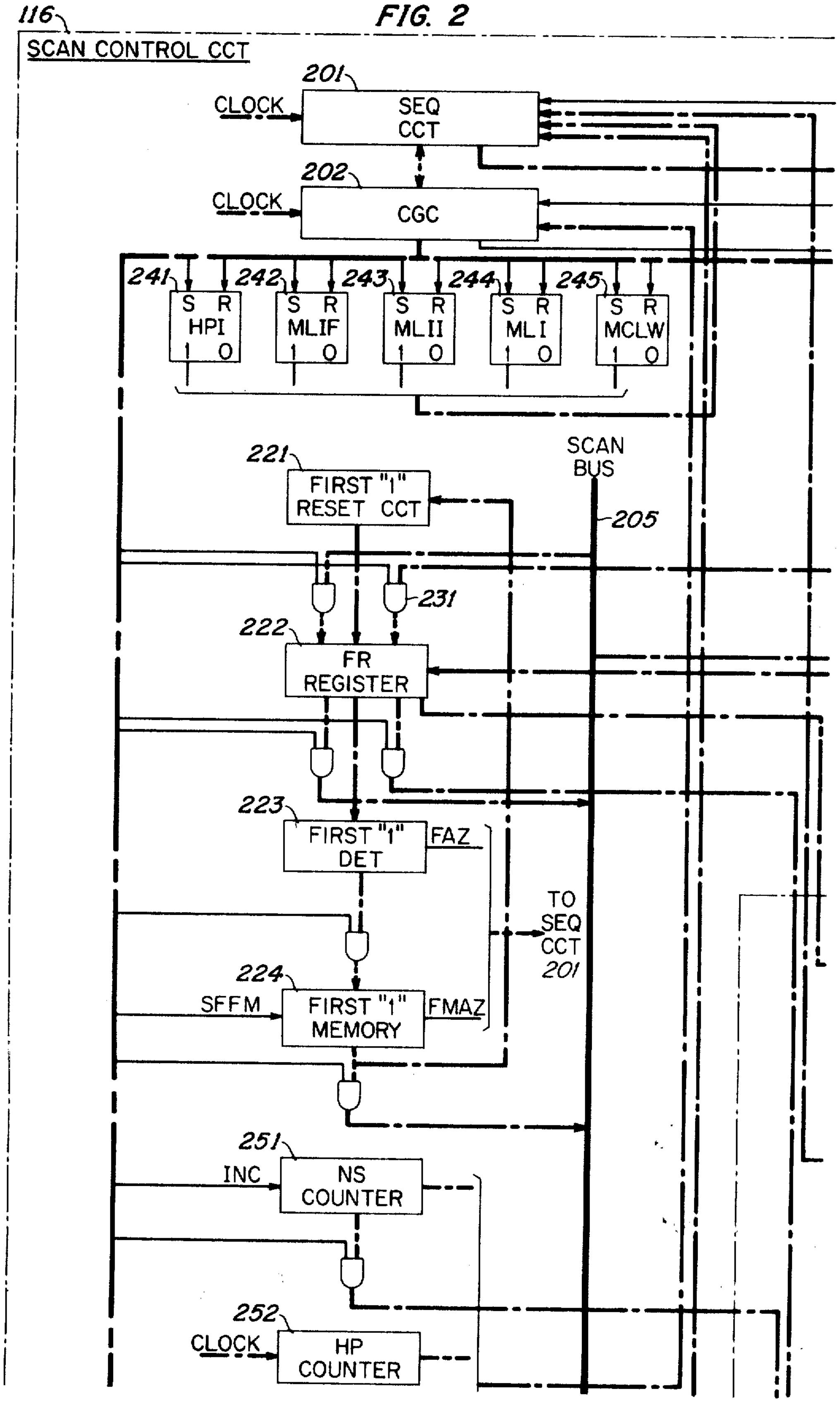
FIGS. 2 through 9, arranged as shown in FIG. 15, form a schematic representation of a buffer processor in accordance with this invention.
Figure 3:
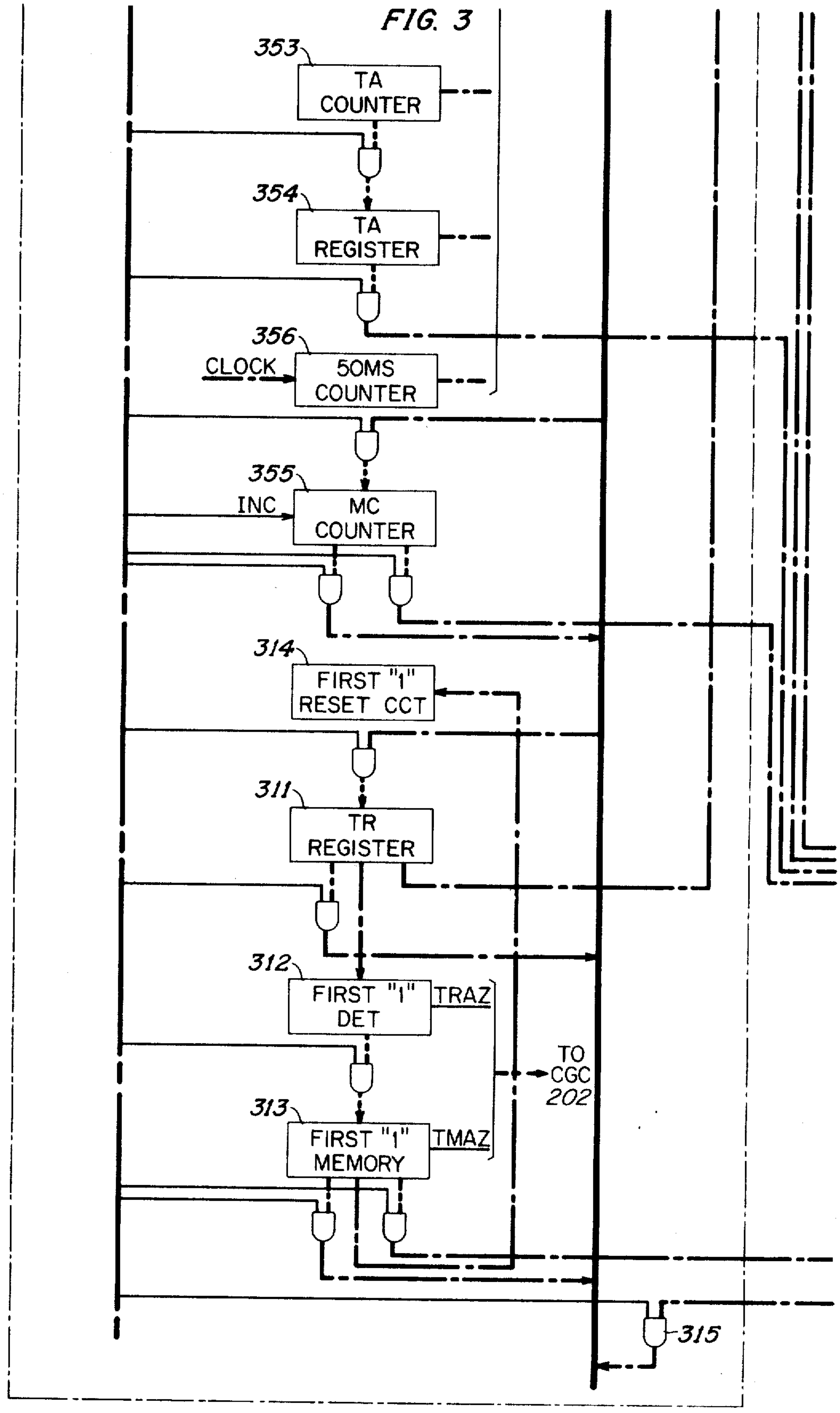
Figure 4:
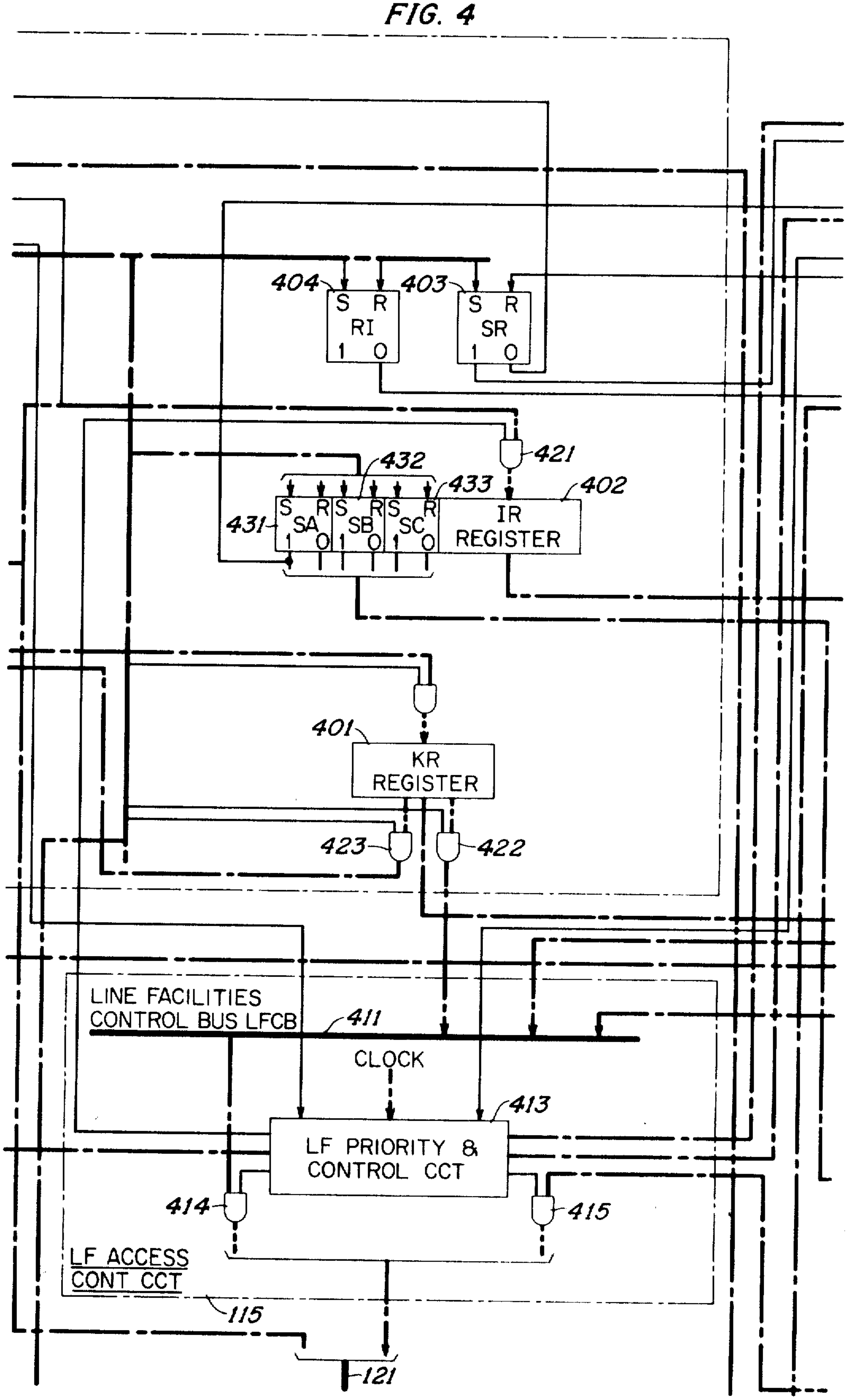
Figure 5:
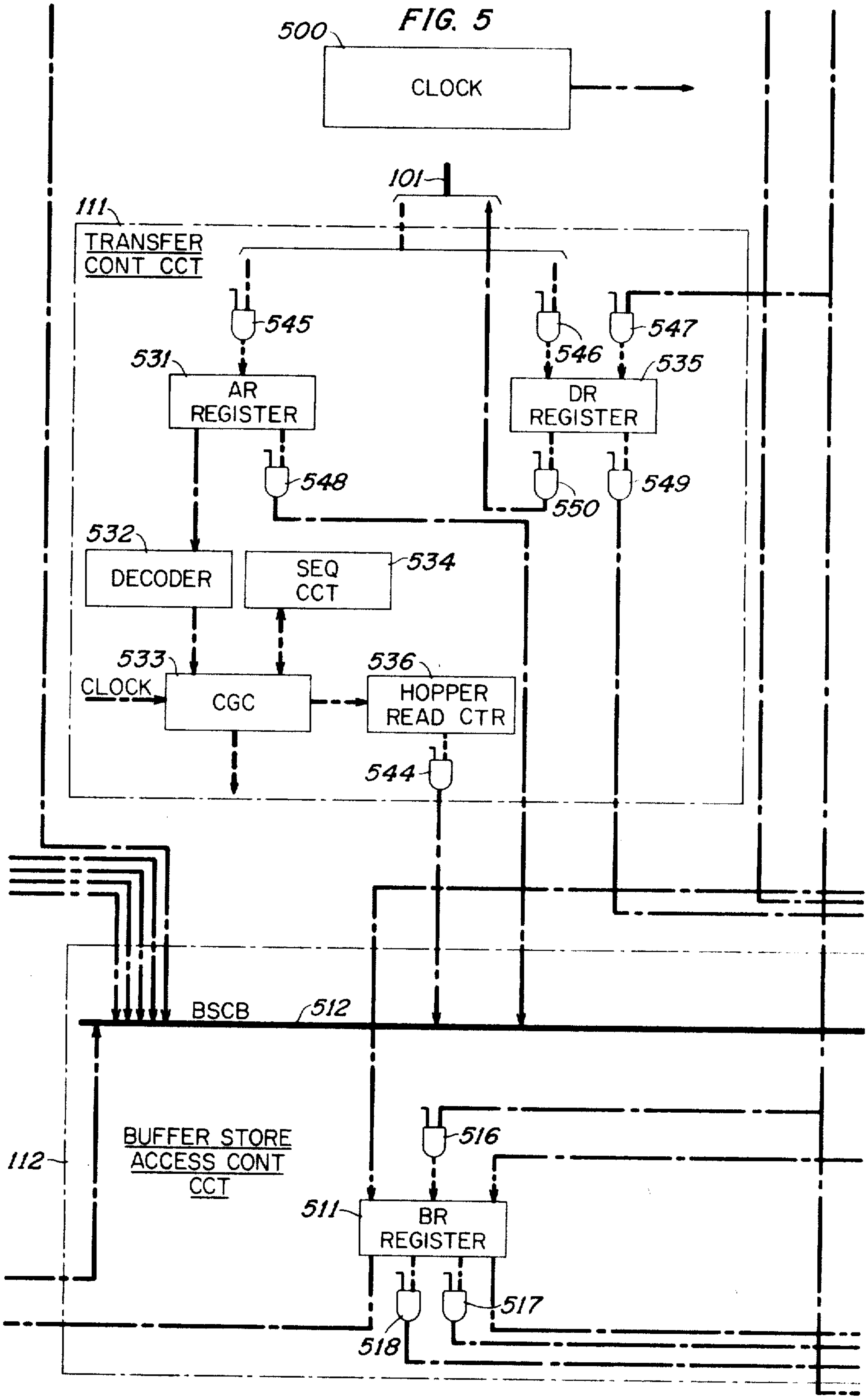
Figure 10:
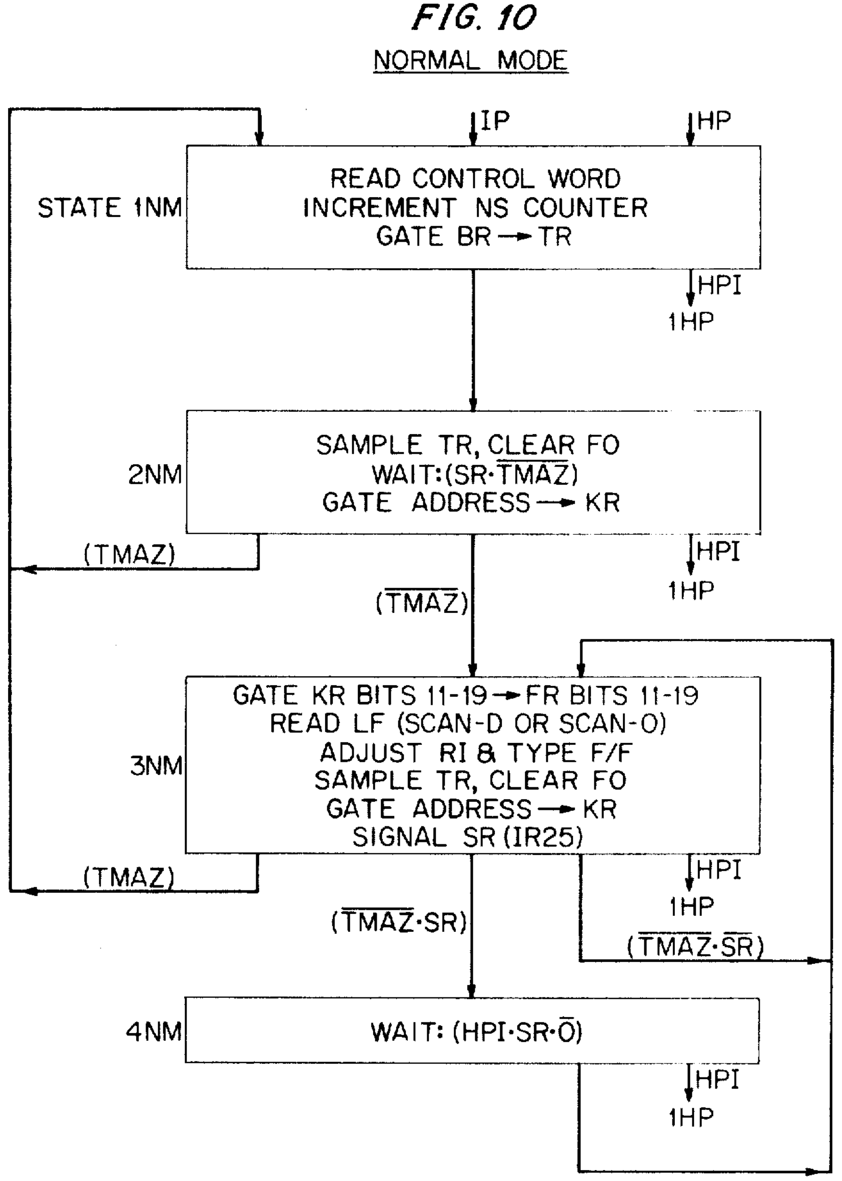
FIGS. 10 through 12 are flow diagrams showing schematically the operations of the scan control circuit of this invention.
Figure 11:
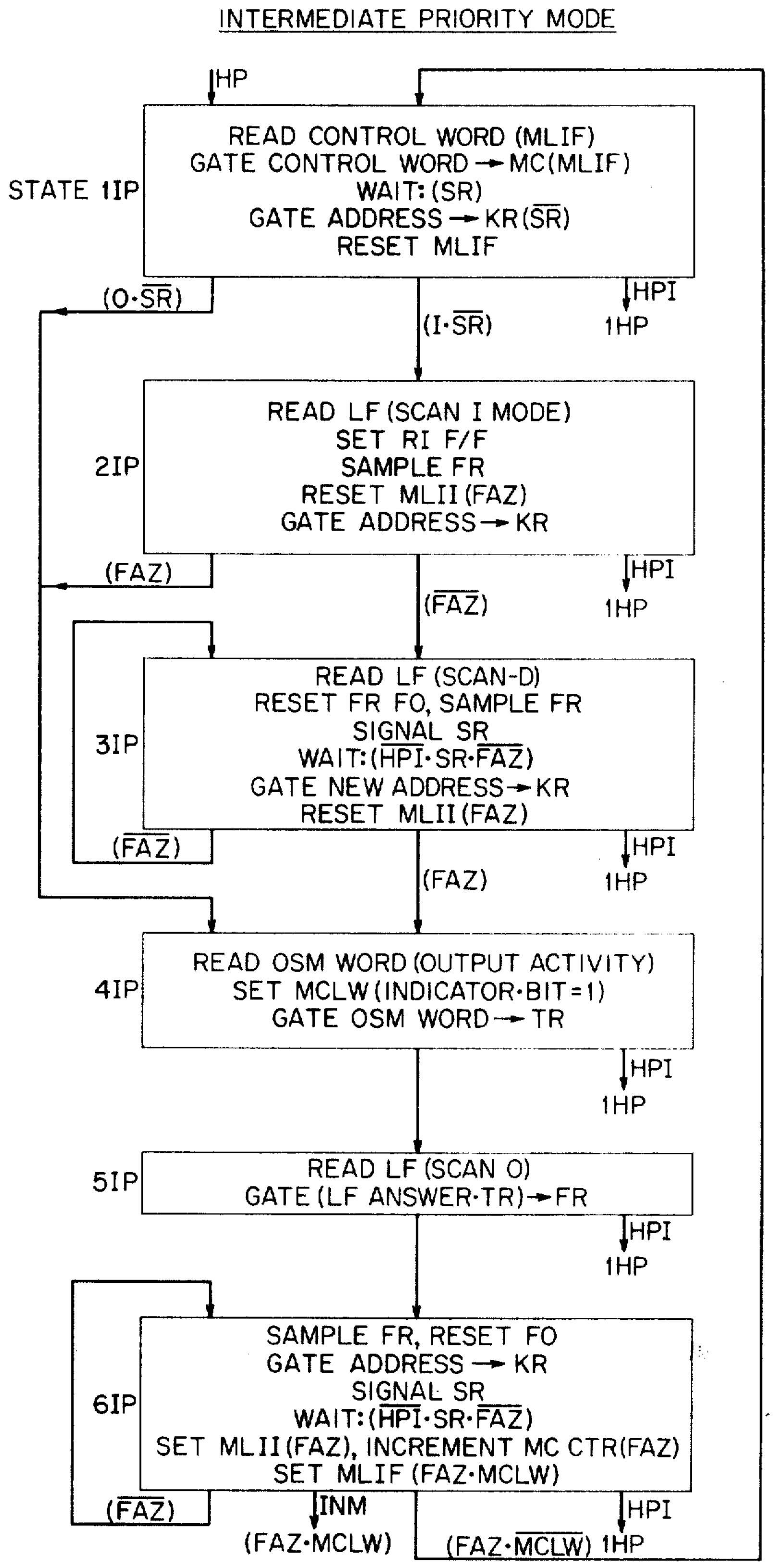
Figure 12:
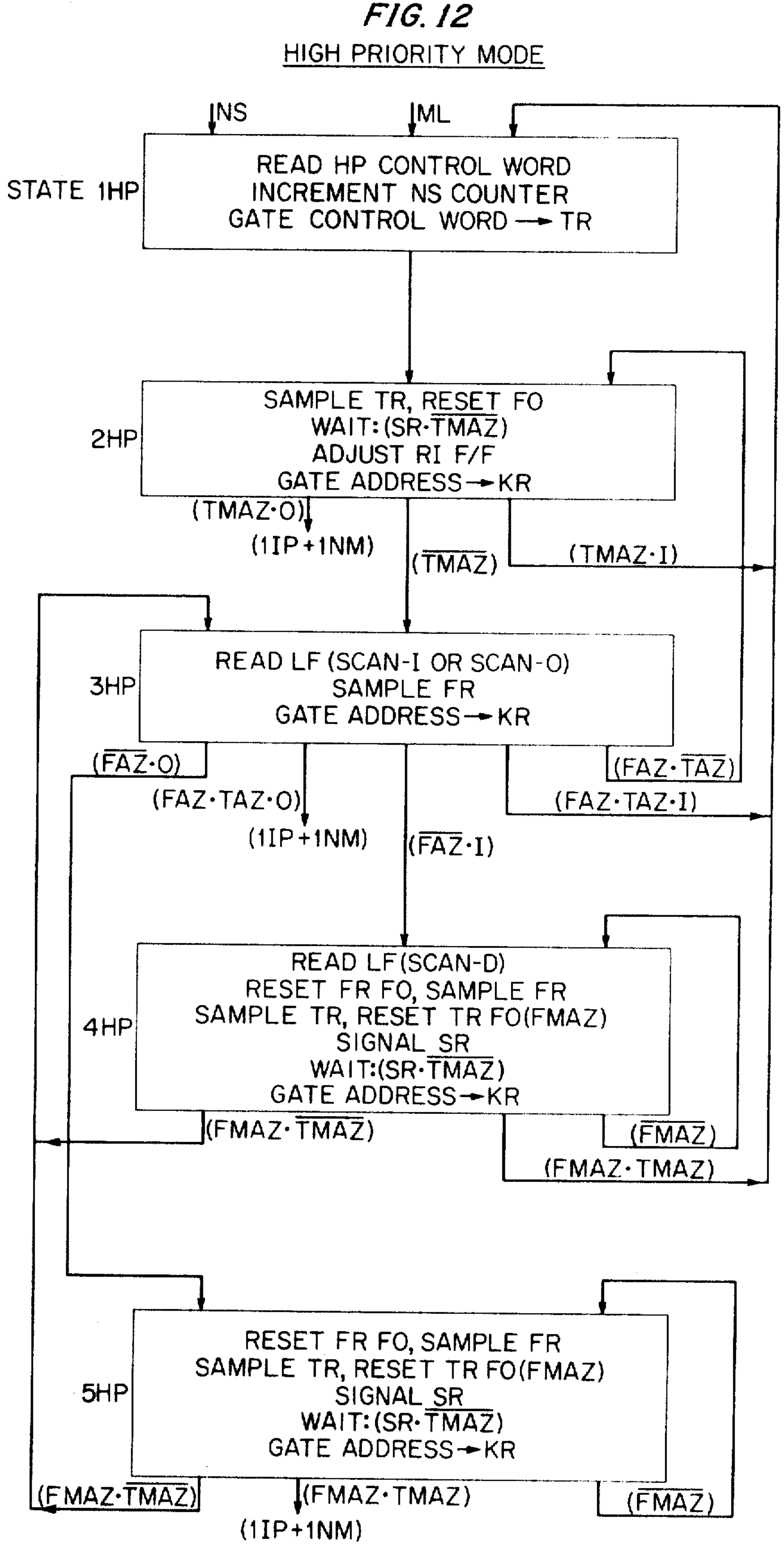

As shown in FIGS. 2 through 4, the Scan Control Circuit 116 comprises a plurality of registers (e.g., 222, 311) and counters (e.g., 251, 252), a Sequencing Circuit 201 and a Combining Gate Circuit 202. The Scan Control Circuit 116 is arranged to operate in three distinct modes, the NORMAL mode, the INTERMEDIATE PRIORITY mode, and the HIGH PRIORITY mode, to service the data line buffers of the system at predetermined repetition rates. Operations in each mode are controlled by the Sequencing Circuit 201 which assumes various states for each mode as indicated in FIGS. 10 through 12. The Sequencing Circuit 201 remains in each labeled state (e.g, 1NM, 3HP, etc.) for one 5.5 microsecond machine cycle unless specific conditions require that a particular state be held for more than one cycle. Outputs from the Sequencing Circuit 201 are combined in the Combining Gate Circuit 202 with clock pulses generated by the Clock 500 and other signal information obtained from various flip-flops, registers, and counters to produce control pulses for governing the operations of the Scan Control Circuit 116. Operations in the INTERMEDIATE PRIORITY mode and the NORMAL mode are interrupted approximately once every 1.25 milliseconds, to cause a transfer to the HIGH PRIORITY mode. In the last named mode the Type C buffers and those of the Type B buffers which terminate data lines having data rates greater than 150 bits per second are served. The 1.25 millisecond periods are defined by the High Priority Counter 252, an 8-bit binary counter, which is incremented once every 5.5 microseconds by a clock pulse generated by the Clock 500. When the High Priority Counter 252 reaches the count of 228, the HPI flip-flop 241 is set. This serves as an indication to the Sequencing Circuit 201 that the HIGH PRIORITY mode must be entered. Upon completion of the work which is to be performed in the HIGH PRIORITY mode, the Sequencing Circuit 201 transfers to the INTERMEDIATE PRIORITY mode or the NORMAL mode. The INTERMEDIATE PRIORITY mode is entered, to service Type B buffers which terminate data lines having data rates of less than 150 bits per second, if either the MLI flip-flop 244 is set or if the MLIF flip-flop 242 is reset. The MLI flip-flop 244 is set from the Combining Gate Circuit 202 when the state of the 50MS Counter 356 indicates that 50 milliseconds have elapsed. Thus, the INTERMEDIATE PRIORITY mode is entered from the HIGH PRIORITY mode approximately once every 50 milliseconds. The 50MS Counter 356 is incremented approximately once every 5 milliseconds by a clock pulse generated by the Clock 500. The MLIF flip-flop 242 is reset when work is begun in the INTERMEDIATE PRIORITY mode and is set only after servicing has been completed to all buffers which require service in the INTERMEDIATE PRIORITY mode during a particular 50 millisecond period. Thus, the MLIF flip-flop 242 remains reset if the sequencer transfers from the INTERMEDIATE PRIORITY mode to the HIGH PRIORITY mode, as the result of a 1.25 millisecond interrupt, before all work in the INTERMEDIATE PRIORITY mode is completed. Under such conditions, the sequencer returns to the INTERMEDIATE PRIORITY mode, to resume the work therein, after completion of all the work in the HIGH PRIORITY mode. If the MLI flip-flop 244 is not set and the MLIF flip-flop 242 is not reset after the work in the HIGH PRIORITY mode is finished, the sequencer transfers from the HIGH PRIORITY mode to the NORMAL mode. In the NORMAL mode the Type A data buffers are serviced. Thus, the Sequencing Circuit 201 services Type A buffers, in the NORMAL mode, when there is no work to be done in either the HIGH PRIORITY or the INTERMEDIATE PRIORITY mode.

In each of the three above-mentioned modes the function of the Scan Circuit 116 is essentially the same, i.e., to obtain line status and identification information and system input data for processing by the Character Handling Circuit 117. The following discussion further describes the operational steps performed by the Scan Control Circuit 116 in each of the three modes. In each mode control words are obtained from the Buffer Store 130 which are employed to generate data buffer addresses. The data buffer addresses are employed to provide input service and output service to the buffers defined by the control words. Input service being defined as the obtaining of input line status and system input data; output service being defined as obtaining output line status and the transmitting of system output data to the buffers. In the case of input service, the Scan Control Circuit 116 generates a buffer address, obtains or generates a line number, and obtains the system input data from the data buffer defined by the buffer address. The line address, comprising the buffer address and the line number, is saved in selected registers and the input data is stored in the IR Register 402. Additionally, the RI flip-flop 404 is set and one of the type flip-flops (e.g., 431) is set so as to indicate to the Character Handling Circuit 117 the type of buffer from which the input data was received. Similarly, in the case of output service, the line address is saved, the RI flip-flop 404 is reset, a the type flip-flops are adjusted. The type flip-flops comprise: the SA flip-flop 431 which is set when Type A buffers are serviced, the SB flip-flop 432 which is set when Type B buffers are serviced, and the SC flip-flop 433 which is set when Type C buffers are serviced. The Scan Control Circuit 116 sets the SR flip-flop 403 when input data has been received and when the line address of a line requiring output service has been stored in the appropriate register. The SR flip-flop 403 is reset from the Character Handling Circuit 117 after the necessary information has been obtained from the various registers and flip-flops of the Scan Control Circuit 116 and processing has begun. So long as the SR flip-flop 403 is in the set state the Scan Control Circuit 116 is prevented from disturbing the saved address, the stored input data, and the states of the RI flip-flop 404 and the type flip-flops. However, the Scan Control Circuit 116 does not necessarily stop all operations. Generally, several steps will be performed in the generation of a next address while the SR flip-flop 403 is set; but the saved address is not disturbed. When no further steps can be performed without disturbing the saved information, the Scan Control Circuit 116 waits until the SR flip-flop 403 is reset. When this flip-flop is reset the sequencer proceeds with the additional steps required for the obtaining of new input data or the assembling of a new buffer address for output service.

In the NORMAL mode, the Sequencing Circuit 201 may assume four states, 1NM through 4NM, as indicated in FIG. 10. Entry into the NORMAL mode is made in state 1NM, from either the HIGH PRIORITY mode or the INTERMEDIATE PRIORITY mode, service Type A data buffers. Upon entry into this mode a control word is read from the Buffer Store 130 which contains information necessary for the generation of Type A data buffer addresses. There is an input control word indicating the Type A buffers to be serviced for input service, and an output control word which indicates the Type A buffers to be serviced for output service. On entry into the NORMAL mode, the input control word is obtained and input service is provided to all data buffers specified thereby. Next, the output control word is obtained and output service is provided to all buffers specified by the output control word. Subsequent to completion of performance of output service, the input control word is again obtained and input service performed followed by the performance of output service. This sequence is repeated until it is interrupted and the Sequencing Circuit 201 transfers to the HIGH PRIORITY mode. This interrupt occurs approximately once every 1.25 milliseconds. The input and output control words are stored in fixed adjacent address locations in the Buffer Store 130. The entire fixed address, except for the least significant bit thereof, is generated by the Combining Gate Circuit 202 just prior to the reading of the control word. The least significant bit of the address is obtained from the Normal Scan Counter 251, a single-bit binary counter, which is incremented each time a control word is obtained. The input control word is obtained if the output of the Normal Scan Counter 251 is "0" and the output control word is obtained if it is a "1."

In state 1NM the address of one of the control words is transmitted t the Buffer Store 130. The corresponding control word is received 1the BR Register 511 and gated to the TR Register 311 via Scan Bus 205. The control word comprises a 16-bit word in which there exists a "1" for each buffer to be serviced. There is a direct correspondence between the relative bit position of a "1" within the control word and the address of the buffer to be serviced such that the number which defines the bit position is the address of the corresponding buffer. In state 2NM the TR Register 311 is examined by means of the First "1" Detector 312, to determine the bit position of the rightmost "1" (referred to herein as the first "1"). The binary number of the bit position of the first "1," which represents a buffer address, is gated to the First "1" Memory 313 and is stored therein. Subsequently, the first "1" in the TR Register 311 is reset under control of the First "1" Reset Circuit 314. In case there are no "1's" in the TR Register 311, a signal indicating this condition is generated on Conductor TAZ. If the TR Register 311 is all "0's" when it is sampled, this condition is recorded in the First "1" Memory 313 and a signal is generated on Conductor TMAZ. The latter signal is necessary to distinguish between the case where the TR Register 311 contained all "0's" before a sampling and the case where a "1" existed in the register which was reset by the First "1" Reset Circuit 314 immediately after the sampling operation.

The address stored in the First "1" Memory 313, and command information generated by the Combining Gate Circuit 202, are gated to the KR Register 401 via the Scan Bus 205 in state 2NM. It was mentioned earlier that an addressed buffer transmits status information of output lines in response to the SCAN-0 command. Accordingly, the SCAN-0 command is generated in state 2NM if the output control word was obtained in state 1NM. It is characteristic of Type A data buffers that line status and identification information and input data are transmitted simultaneously in response to SCAN-D command. Accordingly, the SCAN-D command is generated in state 2NM if the input control word was obtained in state 1NM.

Gating of the address and command information into the KR register 401 is state 2NM will not take place unless the SR flip-flop 403 is reset, indicating that the information in the KR Register 401 has been obtained therefrom by the Character Handling Circuit 117. If the SR flip-flop 403 is found to be in the set state, the Sequencing Circuit 201 waits in state 2NM until the SR flip-flop 403 is reset. At that time the new buffer address and command information is gated into KR Register 401, and the Sequencing Circuit 201 advances to state 3NM after completion of state 2NM. Gating new information into the KR Register 401, waiting in state 2NM, and advancing to state 3NM will not take place if the TR Register 311 contained all "0's" at the time of examination. The all "0's" condition is indicated by a signal on Conductor TMAZ. When such a signal is present, the Sequencing Circuit 201 returns to state 1NM to obtain the next control word from the Buffer Store 130 instead of proceeding to state 3NM.

In state 3NM the buffer address and command information are gated from the KR Register 401 to the Line Facilities Control Bus 411 under control of the Combining Gate Circuit 202 and transmitted to the Line Facilities 120 under control of the Priority and Control Circuit 413. The data buffer address is also gated to the FR Register 222 for later use by the Character Handling Circuit 117. The response received from the addressed Type A buffer comprises: a status bit indicating that one of the lines connected to the addressed buffer is ready for service; a line number identifying the line which is ready for service; and, in case of input service, one assembled input character. The line number and, in case of input service, the input character are gated into the IR Register 402 via symbolic AND gate 421. The Combining Gate Circuit 202 responds to the status bit by setting the SR flip-flop 403 thereby indicating to the Character Handling Circuit 117 that information in the IR Register 402 is ready for processing. The RI flip-flop 404 is adjusted in state 3NM in accordance with the Normal Scan Counter 251 to indicate to the Character Handling Circuit 117 whether the operation is an input or an output operation.

During state 3NM, after the contents of the KR REgister 401 have been gated to the Line Facilities 120, the TR register is again sampled to find the next "1" in the control word. The position of the next "1" is recorded in the First "1" Memory 313 and the newly found "1" is reset. The contents of the First "1" Memory 313, which forms a new buffer address, is subsequently gated into the KR Register 401 along with command information. If no more "1's" exist in the TR register at this last sampling, the Sequencing Circuit 201 returns to state 1NM to read the next control word from the Buffer Store 130. However, if the TR register contains one or more "1's," the SR flip-flop 403 is examined. If the latest buffer response indicated that no lines were ready for service, the SR flip-flop 403 will be in the reset state. When such is the case, the new buffer address contained in the KR Register 401 is transmitted to the Line Facilities 120. Thereafter, the functions of state 3NM are repeated until such time as either all "1's" of the TR Register 311 have been reset, or a line which is ready for service has been found. When such a line is found, the SR flip-flop 403 is set and the Sequencing Circuit 201 advances to state 4NM. Having entered state 4NM, the Sequencing Circuit 201 remains in that state until the SR flip-flop 403 is reset by the Character Handling Circuit 117 at which time a return is made to state 3NM where the above-described functions are again performed.

The Sequencing Circuit 201 will operate in the NORMAL made until such time as the HPI flip-flop 241 is set indicating that the HIGH PRIORITY mode must be entered. Since it cannot be priorly determined in which of the NM states the Sequencing Circuit 201 will be found when the HPI flip-flop 241 is set, the HPI flip-flop is sampled at the end of each machine cycle. Thus, the transfer to the HIGH PRIORITY mode (state 1HP) may occur in any of the NM states and occurs even though the Sequencing Circuit 201 is waiting in an NM state. When the Sequencing Circuit 201 returns to the NORMAL mode at a later time, the 1NM state will be entered to service all the Type A buffers regardless of the number of buffers which had been serviced before the interrupt occurred.

The INTERMEDIATE PRIORITY mode is entered approximately once every 50 milliseconds from the HIGH PRIORITY mode to service Type B data line buffers having data rates of less than 150 bits per second. A control word associated with the INTERMEDIATE PRIORITY mode is stored in the Buffer Store 130 and comprises the address of the first buffer of a series of buffers to be serviced in sequence. This address is read from the Buffer store 130 and is employed to provide input service and output service to the first buffer of the series of buffers. The address is stored in the MC Counter 355 where it is incremented by 1 after input service and output service to the first buffer have been completed. The incremented address is then employed to provide input and output service to the second buffer of the series. Thus, a new address is generated each time after service to a buffer has been completed by incrementing the MC Counter 355, and a plurality of buffers are serviced in sequence in this manner. Associated with each data buffer is an output status map which contains information specifying the active output lines terminated on the data buffer. The output status map further contains an indicator bit which is in the set state if the associated buffer is the last of the series of buffers to be serviced in the INTERMEDIATE PRIORITY mode. The Sequencing Circuit 201 transfers to the NORMAL mode after the last buffer, as identified from the output status map, has been serviced for both input and output service.

The various states through which the Sequencing Circuit 201 progresses in the INTERMEDIATE PRIORITY mode are indicated in FIG. 11. Entry into this mode is always made in state 1IP. Entry into state 1IP may occur under three conditions.

1. From the HIGH PRIORITY mode when the previously mentioned MLI flip-flop 244 is set, i.e., when a 50 millisecond period has elapsed since the last servicing of buffers in the INTERMEDIATE PRIORITY mode.

2. From the HIGH PRIORITY mode when the previously mentioned MLIF flip-flop 242 is reset, i.e., previously started work in the INTERMEDIATE PRIORITY mode was interrupted before it was completed.

3. From state 6IP after one or more, but not all, buffers have been serviced for both input service and output service.

When state 1IP is entered from the HIGH PRIORITY mode as a result of the MLI flip-flop 244 being in the set state, the control word is read from the Buffer Store 130 and gated into the MC Counter 355. In state 1IP the control word, which comprises the address of the first buffer of a series of buffers to be serviced, is gated into the KR Register 401 along with command information for subsequent transmission on the Line Facilities Bus 121. Furthermore, the MLIF flip-flop is reset in state 1IP to indicate that servicing of buffers in the INTERMEDIATE PRIORITY mode has been started but has not been completed. When state 1IP is entered from the HIGH PRIORITY mode as a result of the MLIF flip-flop 242 being in the reset state, the address found in the MC Counter 355 is gated into the KR Register 401 without obtaining a control word from the Buffer Store 130. Similarly, when state 1IP is entered from state 6IP, the address found in the MC Counter 355 is gated to the KR Register 401 and no control word is obtained from the Buffer Store 130. The MLII flip-flop 243, which serves as an input-output indicator in the INTERMEDIATE PRIORITY mode, is examined in state 1IP to determine whether input or output service must be performed. When state 1IP is entered from the HIGH PRIORITY Mode to resume interrupted work in the INTERMEDIATE PRIORITY mode (i.e., the MLIF flip-flop 242 is reset), the state of the MLII flip-flop 243 indicates whether input or output service was in progress when the interrupt occurred. If the interrupt occurred during input service, the input service is performed, followed by output service, for the buffer whose address is found in the MC Counter 355. If the interrupt occurred during output service, only output service is performed for that buffer.

From state 1IP the Sequencing Circuit 201 advances to state 2IP if input service is to be performed and to state 4IP if output service is to be performed. In state 2IP the address information contained in the KR Register 401, comprising a buffer address and the SCAN-I command, is transmitted to the Line Facilities 120. The response from the addressed buffer comprises a 16-bit input service request word which is entered in the FR Register 222. The input service request word contains a "1" for each line from which an input data character has been assembled in the data buffer. There is a direct correspondence between the relative position of a bit of the service request word and a line number such that the number defining the bit position of a "1" in the service request word is the same as the line number of the corresponding data line. The 16-bit service request word is examined in the FR Register 222 by means of the First "1" Detector 223. The position of the first "1," which corresponds to the line number of a line requesting service, is stored in the First "1" Memory 224. Subsequently, a complete line address comprising the buffer address stored in the MC Counter 355, the line number, and the SCAN-D command is entered into the KR Register 401. In case the input service request word stored in the FR Register 222 is all "0',s" indicating that the addressed buffer has no lines ready for input service, the Sequencing Circuit 201 advances from state 2IP to state 4IP to perform the necessary output service; otherwise, it advances to state 3IP. In state 3IP the address information contained in the KR Register 401 is transmitted to the Line Facilities 120 and the addressed buffer returns the assembled input data character obtained from the line whose line number was contained in the address information. The data character obtained from the Line Facilities 120 is entered in the IR Register 402 for further processing by the Character Handling Circuit 117, and the SR flip-flop 403 is set. In state 3IP the first "1" of FR Register 222, which was detected in state 2IP, is reset, and the FR Register 222 is again sampled to detect the next "1." The location of the next "1,"

which represents the line number of the next line ready for input service, is recorded in the First "1" Memory 224. The Sequencing Circuit 201 waits in state 3IP until the SR flip-flop 403 is reset at which time new address information comprising the same buffer address, the new line number derived from the location of the next "1" in the FR Register 222, and the SCAN-D command is gated into the KR Register 401. Subsequently, the address information is transmitted to the Line Facilities 120 and a data word is received therefrom. The Sequencing Circuit 201 repeatedly traverses state 3IP generating new addresses and obtaining new data until the FR Register 222 contains all "0's." When the FR Register 222 has all "0'," input service to the buffer whose address is in the MC Counter 355 has been completed. Subsequently, the Sequencing Circuit 201 progresses through states 4IP, 5IP, and 6IP to perform output service to the same buffer. In state 4IP the output status map associated with the buffer unit whose address is in the MC Counter 355 is obtained from the Buffer Store 130 and is entered in the TR Register 311. In case it is found that the previously mentioned indicator bit of the output status map is in the set state, indicating that this is the last buffer of the series of buffers to be serviced in the INTERMEDIATE PRIORITY mode, the MCLW flip-flop 245 is set. In state 5IP the buffer address and the SCAN-O command are transmitted to the Line Facilities 120 and an output service request word is returned by the addressed buffer. The service request word and the status map information contained in the TR Register 311 are ANDed into the FR Register 222 to produce a "1" in the FR Register 222 only in those positions where the output status map and the service request word both have a "1." The FR Register 222 is sampled in state 6IP and the result thereof is employed to generate a line number which is gated to the KR Register 401 along with the buffer address for output processing by the Character Handling Circuit 117. The SR flip-flop 403 is set after each time a new address is entered into the KR Register 401, and the Sequencing Circuit 201 waits in the 6IP state until the SR flip-flop 403 is reset by the Character Handling Circuit 117. After the SR flip-flop 403 is reset, state 6IP is again traversed. The FR Register 222 is sampled once again, a new address is gated into the KR Register 401, and the SR flip-flop 403 is set. When a new address has been generated for each "1" originally found in the FR Register 222, the MC Counter 355, which contains the buffer address, is incremented and the sequencer transfers to state 1IP to repeat the operations discussed as occurring in states 1IP through 6IP. If it is found in state 6IP that the MCLW flip-flop was set in state 4IP, indicating that the associated buffer is the last buffer of the series of buffers to be serviced in the INTERMEDIATE PRIORITY mode, the Sequencing Circuit 201 advances to the 1NM state upon completion of all the work in the 6IP state, to perform further tasks in the NORMAL mode.

The HIGH PRIORITY mode is entered approximately once every 1.25 milliseconds to service Type C data line buffers and Type B data line buffers terminating lines having data rates of greater than 150 bits per second. There are 16 control words, stored in 16 sequential address locations in the Buffer Store 130, which define the operations of the Scan Control Circuit 116 in the HIGH PRIORITY mode. The group consists of eight input control words and eight output control words each specifying which buffers are to be serviced, by the presence of a "1" or a "0" in a bit position uniquely associated with each buffer. Only one input control word and one output control word are obtained from the Buffer Store 130 each time work is performed in the HIGH PRIORITY mode. The input control word is obtained first and all buffers for which there is a "1" in the associated bit position of the input control word are serviced for input service before the output control word is obtained. Upon having provided output service to all buffers for which there is a "1" in the associated bit position of the output control word, the Scan Control Circuit 116 returns to either the INTERMEDIATE PRIORITY or the NORMAL mode. When the next entry into the HIGH PRIORITY mode occurs, the pair of control words located at the next sequential address locations will be obtained and the thereby indicated buffers will be serviced. The address of each control word is formed by combining the output of the NS Counter 251, which becomes the least significant bit, the TA Register 354, which forms bits 1 through 3 of the address, and certain fixed address information generated on the Buffer Store Control Bus 512 by the Combining Gate Circuit 202. The NS Counter 251 is a single-bit binary counter for indicating whether the operations performed are input service or output service operations. The TA Register 354 obtains its contents from the TA Counter 353 which is incremented each time the HIGH PRIORITY mode is entered.

Since each of the eight control words specifies the buffers to be serviced in one 1.25 millisecond period, the frequency of input service and output service in the HIGH PRIORITY mode may be individually controlled for each buffer by entering selected control information in the appropriate control words. For example, if it is desired that a selected buffer should be serviced for input service once every 1.25 milliseconds and for output service once every 2.50 milliseconds, each of the eight input control words and every alternate one of the output control words must contain a "1" in the bit position associated with the selected buffer. Similarly, if input or output service to a selected buffer is desired only once every 10 milliseconds, only one of the eight input or output control words should have a "1" in the bit position corresponding to the selected buffer.

In the HIGH PRIORITY mode the Sequencing Circuit 201 advances through states 1HP through 5HP as shown schematically in FIG. 12. In state 1HP the scan control word, which may be either an input scan control word or an output scan control word depending on the state of the NS Counter 251, is obtained from memory and gated into the TR Register 311. In state 2HP the TR Register 311 is sampled to find the first "1" by means of the First "1" Detector 312. The position of the first "1," which represents the address of the first buffer to be serviced, is recorded in the First "1" Memory 313, and the first "1" is reset by means of the First "1" Reset Circuit 314. If the SR flip-flop 403 is not in the set state as the result of activity which occurred prior to entry into the HIGH PRIORITY mode, the buffer address is gated into the KR Register 401 along with either the SCAN-I or the SCAN-O command. Assuming that the control word contained at least one "1," the Sequencing Circuit 201 advances to state 3HP. In case the TR Register 311 contains all "0's" at the time of sampling, which is indicated by a signal on Conductor TMAZ, the Sequencing Circuit 201 returns to state 1HP if the TR Register 311 contains an input control word and to either state 1IP or 1NM if it contains an output control word. In state 3HP the address information stored in the KR Register 401 is transmitted to the Line Facilities 120 to obtain a 16-bit input or output service request word. There is a direct correspondence between the relative position of a bit in the service request words and line numbers, such that the number defining a bit position is a line number. Accordingly, the input service request word indicates which lines are ready for input service by the presence of a "1" in each bit position which corresponds to a line which is ready for input service. Similarly, the output service request word indicates which lines are ready for output service. The 16-bit service request word is entered in the FR Register 222 where it is sampled by means of the First "1" Detector 223 to find the first "1." The number defining the bit position of the first "1," which represents a line number, is stored in the First "1" Memory 224. Note that the found "1" is not reset at this time. The contents of the First "1" Memory 224 representing the line number, the contents of the First "1" Memory 313 representing the buffer address, and, in case of input service, the SCAN-D command are gated into the KR Register 401. Assuming that the FR Register 222 contains at least one "1," the Sequencing Circuit 201 advances to state 4HP if the service request word received from the addressed buffer is an input service request word and to state 5HP if it is an output service request word. If the FR Register 222 does not contain any "1's," as indicated by a signal on Conductor FAZ, the TR Register 311 is consulted. If the TR Register 311 is not all "0' s" at that time, the Sequencing Circuit 201 returns to state 2HP to generate the address of the next buffer by finding the next "1" in the TR Register 311. State 3HP is then entered once again to obtain the corresponding service request word. If the TR Register 311 and the FR Register 222 both contain all "0's" at the end of state 3HP, the NS Counter 251 is consulted to determine whether the last control word read from the Buffer Store 130, and gated into the TR Register 311, was an input or an output control word. If it was an input control word, the corresponding output control word must be read from the Buffer Store 130. Consequently, a transfer is made from state 3HP to state 1HP in order to obtain the output control word. However, if in state 3HP the NS Counter 251 indicates that the last read word is the output control word, and both the TR Register 311 and the FR Register 222 contain all "0'," then there is no further work to be done in the HIGH PRIORITY mode. Therefore, under the latter conditions, the Sequencing Circuit 201 changes from the HIGH PRIORITY mode to either the INTERMEDIATE PRIORITY or NORMAL mode.

In state 4HP the address information, which was gated to the KR Register 401 in state 3HP, is transmitted to the Line Facilities 120 and an assembled input data character is received from the addressed buffer and gated into the IR Register 402. Additionally, the SR flip-flop 403 is set to signal the Character Handling Circuit 117. The first "1" of the FR Register 222 which was detected in state 2HP is reset in state 4HP under control of the First "1" Reset Circuit 221. Thereafter, the FR Register 222 is again sampled by the First "1" Detector 223 to find the next "1." The number which defines the bit position of the next "1," and which represents a line number, is recorded in First "1" Memory 224. The TR Register 311 is also sampled in state 4HP to find the next "1," but the last detected "1" of the TR Register 311 is reset only when the FR Register 222 contains all "0 's." Thus, the contents of the First "1" Memory 313 are not changed until after all "1's" in the FR Register 222 have been reset. If the TR Register 311 was not all "0's" prior to the last sampling, further actions in the 4HP state are inhibited until the SR flip-flop 403 is reset. Thereafter, new address information comprising the line number contained in the First "1" Memory 224, the buffer address contained in the First "1" Memory 313, and the SCAN-D command are gated into the KR Register 401.

Assuming that the FR Register 222 contained at least one "1" at the time it was sampled, the operations of state 4HP are repeated, including the transmission of the address information contained in the KR Register 401, the resetting of the last found "1" in the FR Register 222, and the insertion of new address information in the KR Register 401. The operations of state 4HP are repeated until the FR Register 222 contains no more "1's," that is, until all lines of the buffer whose address is in the First "1" Memory 313 have been serviced. Thereafter, a new buffer address is generated in state 4HP by finding the bit position of the next "1" of the TR Register 311 and recording the number defining the bit position in the First "1" Memory 313. The sequencer subsequently transfers to state 3HP where the newly generated buffer address is transmitted to the Line Facilities 120 along with the SCAN-I command. The service request word received in response thereto is gated into the FR Register 222 and all previously discussed operations of states 3HP and 4HP are performed.

Eventually, the case arises where the TR Register 311 and the FR Register 222 both contain only "0's." This occurs when input service has been performed on all buffers identified by the input control word which was obtained in state 1HP. In that case, a transfer is made from state 4HP to state 1HP in order to read the output control word from the Buffer Store 130. After the output control word has been read in state 1HP, the Sequencing Circuit 201 progresses through states 2HP and 3HP to state 5HP. The operations in state 5HP are identical to those of state 4HP except that in state 5HP the generated address information, consisting of a buffer address and a line number, is stored in the KR Register 401, but is not transmitted to the Line Facilities 120. The address information is simply placed in the Register 401 to be obtained therefrom by the Character Handling Circuit 117 and to be used in transmitting system output data to the Line Facilities 120. The SR flip-flop 403 is set from the Combining Gate Circuit 202 each time a new address is gated into the KR Register, and is reset by the Character Handling Circuit 117 after the address information has been obtained therefrom. The Sequencing Circuit 201 remains in state 5HP until a line number has been generated and inserted into the KR Register 401 for each "1" originally found in the output service request word stored in the FR REGISTER 222. When all "1's" of the FR Register 222 have been reset, the TR Register is sampled to find the next "1" therein and a transfer is made to state 3HP to obtain the next output service request word. When both the TR Register 311 and the FR Register 222 contain only "0'5," output service has been provided to all buffers identified by the output control word. Accordingly, under those conditions, the Sequencing Circuit 201 changes from the HIGH PRIORITY mode to either the INTERMEDIATE PRIORITY or the NORMAL mode.

CHARACTER HANDLING CIRCUIT 117

The Character Handling Circuit 117 processes system input data obtained by the Scan Control Circuit 116 and stores the input data in the Buffer Store 130 for further processing by the Central processor 100. Additionally, the Character Handling Circuit 117 supplies output data to the data line buffers of the Line Facilities 120 in accordance with service request information obtained by the Scan Control Circuit 116. System input data is received form the Type A and Type B buffers in the form of a single character and from Type C buffers in the form of a 23-bit data word. All 23-bit data words received from a particular line are stored in selected areas of the Buffer Store 130 for subsequent processing by the Central Processor 100. Single characters received from each line connected to a Type A or Type B buffer are stored in predetermined locations of the Buffer Store 130 until three data characters have been received. Three character words and line addresses identifying the line from which the characters were received are stored in a designated area of the Buffer Store 130, referred to herein as the data hopper. The data hopper comprises 1,024 address locations which are sequentially loaded by the Character Handling Circuit 117 and which are unloaded by a Central Processor 100 by means of the Transfer Control Circuit 111. The address of the next location available for the storage of input data is derived from the Hopper Write Counter 716 which is incremented each time a hopper entry is made. Similarly, the Hopper Read Counter 536 defines the address of the next location of the data hopper to be read by the Transfer Control Circuit 111 in response to a command from the Central Processor 100.

A plurality of address locations of the Buffer Store 130 have been reserved to store therein information which is uniquely associated with a data line. Such locations are referred to herein as per line words. Each per line word has a buffer store address which is related to the line address of the associated line such that the buffer store address of a per line word may be derived by adding a predetermined constant to the line address of the associated line; the line address comprising a buffer address and a line number, as discussed earlier herein. The per line words comprise:

1. A class of service word containing information indicating, for example, the character format of the line.

2. An input buffer word for temporarily storing one or two input data characters, or a buffer store address defining a location where input data is to be stored.

3. A character output buffer word containing three output data characters, or a buffer store address defining a location containing output data.

4. A transmit word for temporarily storing one or two output data characters.

The Character Handling Circuit 117 obtains the line address of a line to be served from the Scan Control Circuit 116 and stores it in the LR Register 711. The Line Parameter Circuit 724 contains four constants, namely, the class of service word parameter, the input buffer word parameter, the character output buffer word parameter, and the transmit word parameter. When a per line word address is to be generated, the line address in the LR Register 711 and a selected one of the constants of the Line Parameter Circuit 724 are arithmetically added in the Line Adder 725. The output of the Line Adder 725 is the desired buffer store address, which is subsequently transmitted to the Buffer Store 130.

Additionally, there are several buffer store address locations which are specifically reserved for use by the Character Handling Circuit 117. These areas will be discussed later herein in connection with the functions of the Character Handling Circuit 117 which employ these locations.

Figure 6:
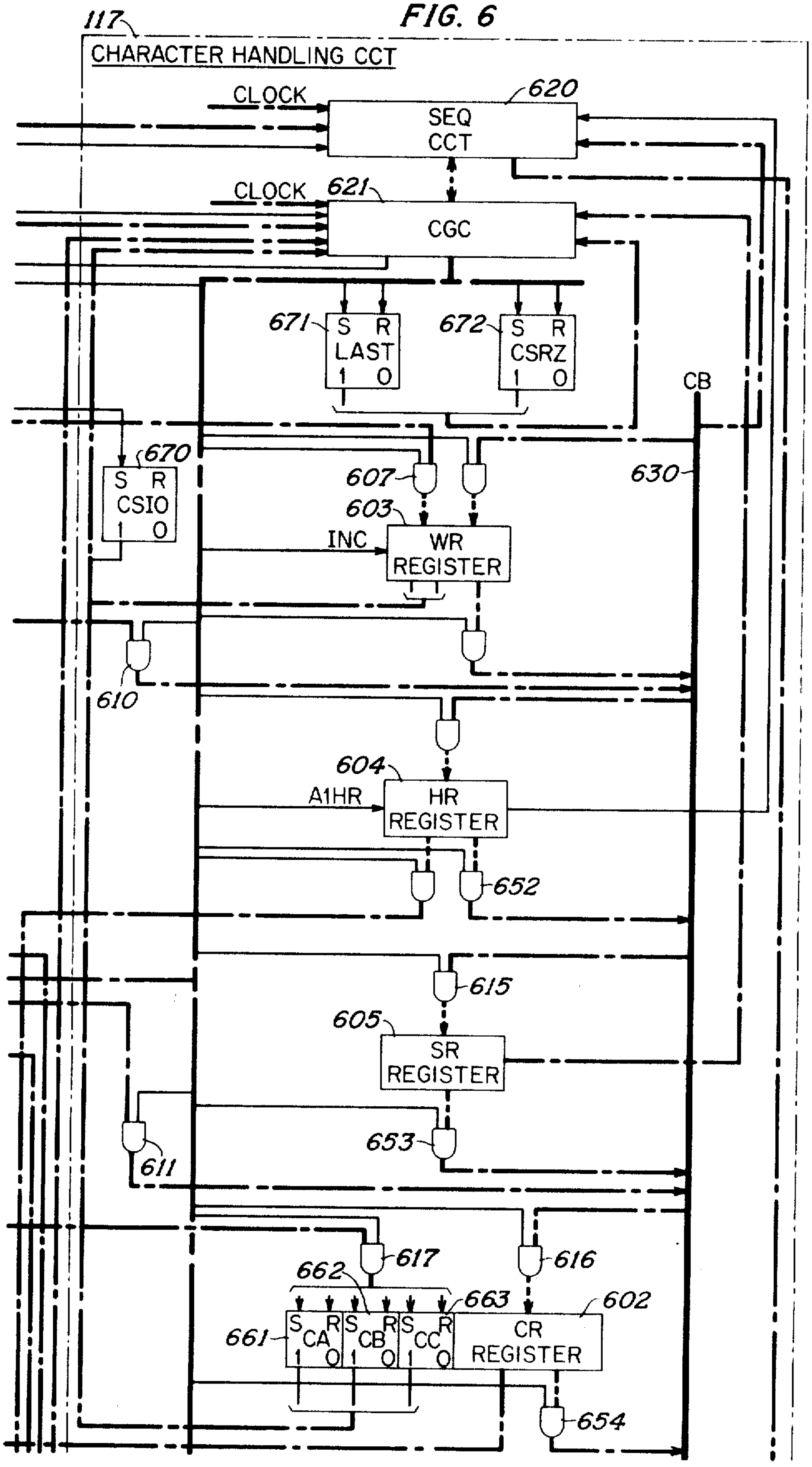
Figure 7:
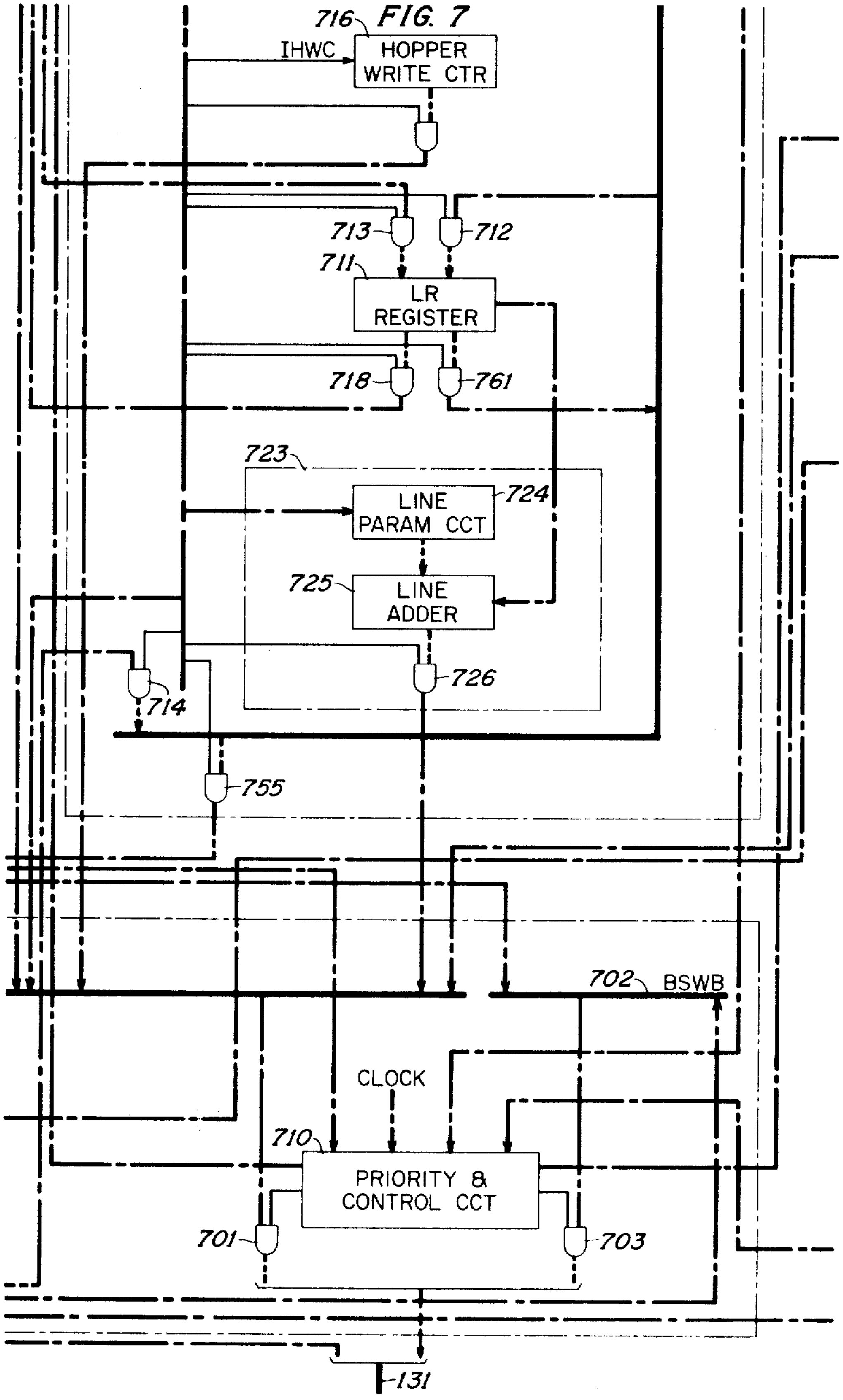
Figure 13:
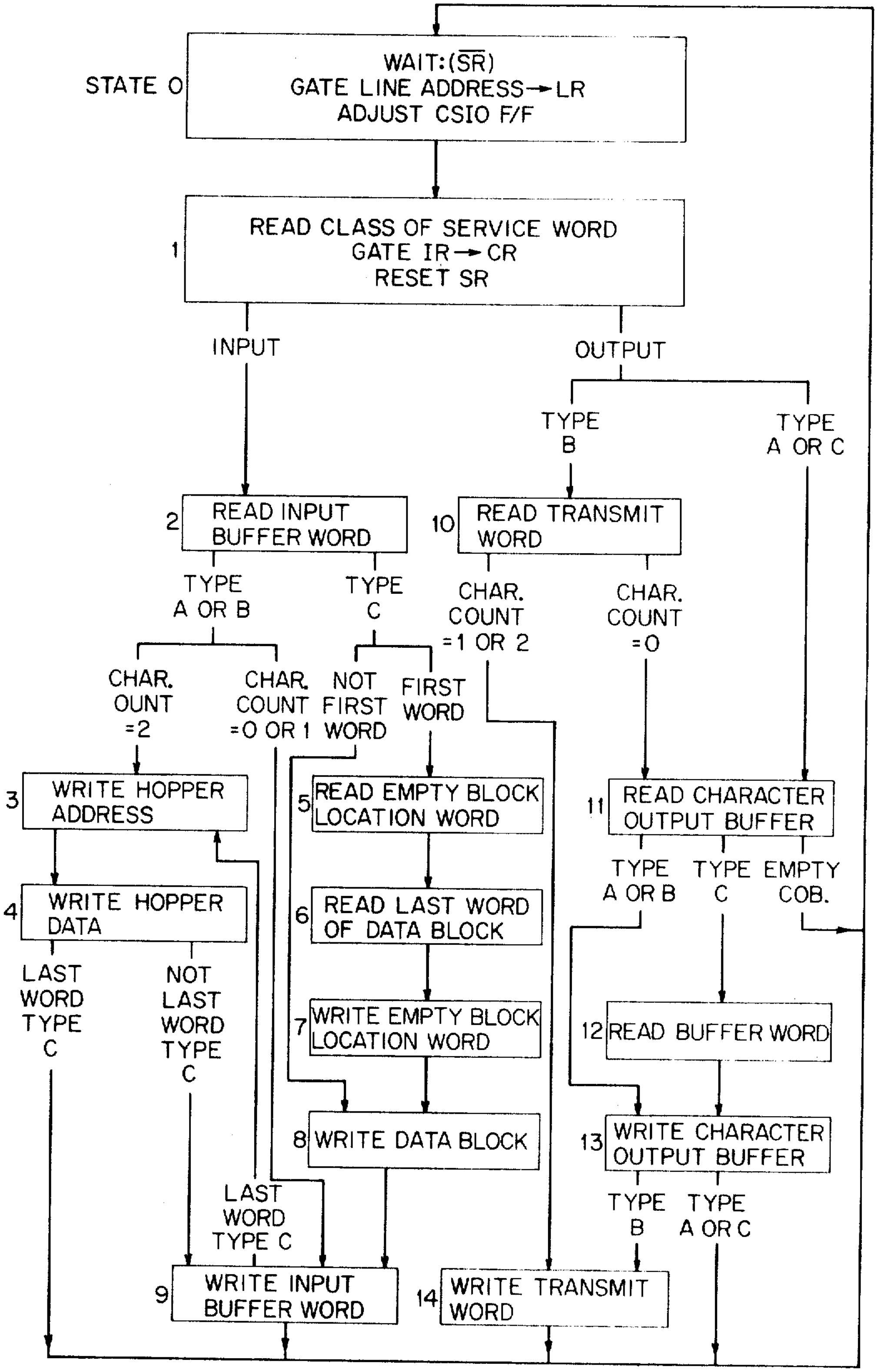
FIG. 13 is a flow diagram showing schematically the operation of the character handling circuit of this invention.

As shown in FIGS. 6 and 7, the Character Handling Circuit 117 comprises: a plurality of registers (e.g., LR Register 711, CR Register 602, etc.) for temporarily storing data words and addresses; the Character Bus 630 for transferring information between the several registers; the Sequencing Circuit 620; and the Combining Gate Circuit 621. The Sequencing Circuit 620 is a multistate circuit capable of progressing through various sequences of states which are selected in accordance with the work functions to be performed. The various states and sequences of states are indicated in FIG. 13. The state outputs of the Sequencing Circuit 620 are combined in the Combining Gate Circuit 621 with clock pulses and signals derived from various other circuits of the Buffer Processor 110. Output signals of the Combining Gate Circuit 621 control the operations of the various elements of the Character Handling Circuit 117.

The Sequencing Circuit 620 is adapted to return to state 0 from any of several states upon the completion of a task and to remain in that state until the SR flip-flop 403 is found to be in the set state. When the SR flip-flop 403 is in the set state, the line address comprising a buffer address and a line number is obtained from the Scan Control Circuit 116. The desired line address is obtained from the KR Register 401 if it is associated with a Type B or Type C data line buffer. However, as was mentioned earlier, the Scan Control Circuit 116 stores the buffer address of a Type A buffer in the FR Register 222, and stores the line number of the line of the buffer which is ready for service in the IR Register 402. Therefore, in the case of Type A buffers, the Character Handling Circuit 117 obtains the buffer address and line number from the FR Register 22 and the IR Register 402, respectively. The output of the SA flip-flop 431 indicates to the Combining Gate Circuit 621 whether or not the buffer to be serviced is a Type A buffer. If it is not a Type A buffer, the Combining Gate Circuit 621 activates symbolic AND gate 713 to gate the line address from the KR Register 401 to the LR Register 711; if it is a Type A buffer, the Combining Gate Circuit 621 activates symbolic AND gates 610, 611, and 712 to gate the buffer address from the FR Register 222, and the line number from the IR Register 402 into the LR Register 711. Furthermore, the CSIO flip-flop 670 is adjusted in state 0 in accordance with the state of the RI flip-flop 404 to record whether the operation is to be an input or an output operation. Next, the Sequencing Circuit 620 advances to state 1 where the class of service word, which contains data format information, etc., is obtained from the Buffer Store 130 and stored in the SR Register 605. The buffer store address of the class of service word is generated in the Line Adder 725 by adding the class of service word parameter, obtained from the Line Parameter Circuit 724, to the line address stored in the LR Register 711. In state 1 the CA, CB, and CC flip-flops 661, 662, and 663 are adjusted in accordance with the states of the SA, SB, SC flip-flops 431, 432, and 433 and, in case of input service, input data is gated from the IR Register 402 to the CR Register 602. Furthermore, the SR flip-flop 403 is reset.

Sequencing Circuit 620 advances from state 1 to state 2 in case of an input operation and to state 10 or state 11 in case of an output operation. In state 2, the address of the input buffer word is generated in the Line Adder 725 by adding the input buffer word parameter to the line address, and the input buffer word is obtained from the Buffer Store 130 and gated into the WR Register 603. It is additionally gated into the HR Register 604 in case the line being serviced is connected to a Type C data buffer. If the line being serviced is not connected to a Type C buffer, the input buffer word contains data characters received from the line since the last time a data hopper entry was made for that line. The two leftmost bits of the input buffer word contain a record of the number of characters in the input buffer word. This record is referred to herein as the character count. In case the character count is equal to two, indicating that the input buffer word contains two characters, the newly received input character stored in the CR Register 602 is combined with the two previously received data characters obtained from the input buffer word to form a three-character word which is written into the data hopper. In order that the data written in the data hopper be properly identified, the line address of the line from which the characters were received is stored in the location immediately preceding the location where the three-character data word is stored. The hopper write operations take place in states 3 and 4. When the Sequencing Circuit 620 enters state 3, the contents of the Hopper Write Counter 716, which form the hopper address, are gated to the Buffer Store Control Bus 512 and the line address contained in the LR Register 711 is gated to the BR Register 511, to be written into the Buffer Store 130 under control of the Priority and Control Circuit 710. Additionally, the Hopper Write Counter 716 is incremented by 1. In state 4, the new contents of the Hopper Write Counter 716 are employed to address the Buffer Store 130. The two previously received data characters, obtained from the input buffer word and stored in the WR Register 603, and the newly received input data character, stored in the CR Register 602, are gated to the BR Register 511 and to the Buffer Store 130 to be written in the hopper. From state 4 the Sequencing Circuit 620 advances to state 9 where the character count in the WR Register 603 is changed to 0. The address of the input buffer word is again generated in state 9 by means of the Line Adder 725 and the contents of the WR Register 603, with the character count of 0, are written in the input buffer word location. After state 9, the Sequencing Circuit 620 returns to state 0.

If, while in state 2, it is found that the character count in the WR Register 603 is equal to 0 or 1, the newly obtained input character, which was gated into the CR Register 602 in state 1, is entered in the input buffer word, but no hopper entry is made. In that case, the sequencing circuit advances directly from state 2 to state 9 to write the new information in the input buffer word. The address of the input buffer word is again generated in Line Adder 725. Additionally, the character count in the WR Register 603 is incremented by 1 and the contents of the WR Register 603 and the data character contained in the CR Register 602 are gated to the BR Register 511 and to the Buffer Store 130 to be written into the input buffer word location. Having completed the functions of state 9, the Sequencing Circuit 620 returns to state 0.

Incoming data from Type C data buffers is received in the form of a 23-bit data word and stored in 32-word data blocks in the Buffer Store 130. After 32 data words have been received from a line, the address of the 32-word data block and the line address of the line from which the data was received are stored in two successive locations of the data hopper. When the Central Processor 100 subsequently reads the data hopper, it employs the block address to obtain the input data from the block. After a 32-word data block has been filled with input data received from a particular line, the Character Handling Circuit 117 must find an available empty 32-word block where input data subsequently arriving from the same line can be stored. Empty 32-word data blocks exist in various areas of the Buffer Store 130 and are linked by linking addresses in such a manner that the last location of a block contains the address of the first location of the next available data block. When a new 32-word data clock is started, the linking address is obtained from the new block and stored in a dedicated location of the Buffer Store 130, which is named the empty block location word. Each time a new data block is started, the address of the next empty block is obtained from the empty block location word, the last word of the empty block is read to obtain the linking address stored therein, and the newly obtained linking address is written in the empty block location word.

Once a data block has been started for a particular line, the address of the location within a data block where the next incoming 23-bit data word is to be stored is kept in the input buffer word of that line. In state 2 the input buffer word is read from the Buffer Store 130 and the contents thereof gated into the HR Register 604. The five least significant bits of the HR Register 604 comprise a 5-bit counter which is incremented each time a new input data word is entered in the data block. These five bits of the HR Register 604 are examined in state 2. If they are not all "0's," the sequencer advances from state 2 to state 8. If they are all "0's," the sequencer traverses the intermediate states 5, 6, and 7 before entering state 8. In state 8, the address in the HR Register 604 is gated to the Buffer Store 130 via the Buffer Store Control Bus 512, and the input data word, which was gated into the CR Register in state 1, is gated to the BR Register 511 to be written in the Buffer Store 130. From state 8 the Sequencing Circuit 620 advances to state 9 where the five least significant bits of the HR Register 604 are incremented by 1 by a pulse on the Conductor A1HR generated in the Combining Gate Circuit 621. The incremented contents of the HR Register 604 are then written in the input buffer word location in the Buffer Store 130.

If it is found in state 2 that the five least significant bits of the address in the HR Register 604 are all "1's," the LAST flip-flop 671 is set in state 2 and the sequencer first advances from state 2 to state 8 where the input data word is written in the data block, and then advances to state 9. In state 9 the count in the five least significant bits of the HR Register 604 is incremented by 1, thereby causing the five least significant bits to become all "0's." This incremented address is then stored in the input buffer word in the Buffer Store 130. In state 9 the LAST flip-flop 671 is consulted and the sequencer transfers from state 9 to state 0 if the LAST flip-flop 671 is in the reset state and to state 3 if it is in the set state. In state 3, the buffer address and line number which were gated into the LR Register 711 in state 0 are written into the data hopper at the address location specified by the contents of the Hopper Write Counter 716. From state 3 the Sequencing Circuit 620 advances to state 4 where the block address stored in the HR Register 604 is written into the immediately succeeding address location of the data hopper. Upon completion of the functions in state 4 the Sequencing Circuit 620 transfers to state 0.

When the last word of a block is received, the input buffer word written into the Buffer Store in state 9 comprises the address of the filled data block with all "0's" in the five least significant bits. When the succeeding data word is received from the same line, an empty data block must be found to store the received data word. When such is the case, the all "0's" condition in the 5 least significant bits of the block address is detected in state 2 and the sequencer advances from state 2 to state 5. In state 5 the address of the empty block location word is generated on the Buffer Store Control Bus 512 by the Combining Gate Circuit 621 and transmitted to the Buffer Store 130. The contents of the empty block location word received in response thereto are gated into the HR Register 604. The Sequencing Circuit 620 next advances to state 6 where the address of the last word of the empty data block is derived from the address in the HR Register 604, and the linking address is obtained from the empty data block and is gated into the WR Register 603. In state 7 the linking address is written into the empty block location word. From state 7 the Sequencing Circuit 201 advances to state 8.

The functions which are preformed by the Character Handling Circuit 117 for output service differ considerably from those performed for input service. Output data for lines connected to Type A or Type B data buffers is stored in the Buffer Store 130 in the character output buffer word for each such line in the form of a three-character data word. The character output buffer word for each such line is periodically loaded with three-character data words by the Central Processor 100 by means of the Transfer Control Circuit 111. The Character Handling Circuit 117 obtains the three-character data words from the character output buffer words and writes a "1" into the most significant bit of the word to indicate that the character output buffer word is empty.

Type A data buffers have facilities for storing three output data characters awaiting disassembly for each line. Therefore, output data is transmitted to such buffers in the three-character format, i.e., three data characters are transmitted simultaneously. However, Type B data buffers have facilities for storing only one output data character awaiting disassembly for each line, and output data is transmitted to these buffers in the one-character format. In order to transmit a single character each time a line connected to a Type B buffer is serviced, the Character Handling Circuit 117 obtains three characters from the character output buffer word, transmits one of these characters to the data buffer, and stores the two remaining characters in the transmit word associated with the line being serviced. The next two times that the same line is served for output service one character is obtained from the transmit word and transmitted to the associated data line buffer. Output data for lines connected to Type C data line buffers is stored in the Buffer Store 130 in 32-word data blocks, and is transmitted to the data line buffers in the form of a 23-bit word. The 32-word data blocks are periodically loaded by the Central Processor 100 and the address of the data block is stored in the character output buffer word associated with the line on which the data is to be transmitted. The buffer store address stored in the character output buffer word location is incremented by 1 each time a data word is obtained from the data block, to point to the next data word of the block to be transmitted. When all 32 words of a block have been transmitted, the Character Handling Circuit 117 writes a "1" into the most significant bit of the character output buffer word associated with the line on which the words were transmitted.

In the case of output service to Type A data buffers, the sequencing circuit advances from state 1 to state 11, as indicated in FIG. 13. In state 11 the buffer store address of the desired character output buffer word location is generated in the Line Adder 725 by adding the character output buffer word parameter to the line address contained in the LR Register 711. This buffer store address is used to read the character output buffer word. The three-character data word received therefrom is stored in the CR Register 602 for subsequent transmission on the Line Facilities Bus 121, as described later herein. If it is found in state 11 that the character output buffer word is empty, (i.e., the most significant bit contains a "1"), the sequencing circuit returns to state 0. Otherwise, it advances to state 13. In state 13 the address of the character output buffer word is again generated and all "1's" are written in the character output buffer word location in the Buffer Store 130. Thereafter the sequencer returns to state 0. In the case of output service to Type B data line buffers, the sequencer advances from state 1 to state 10 where the transmit word associated with the line to be serviced is read from the Buffer Store 130. The buffer store address of the transmit word being generated by adding the transmit word parameter to the line address in the LR Register 711. When the transmit word is received from Buffer Store 130, it is gated into the WR Register 603 via symbolic AND gate 607 without going through the BR Register 511. The two most significant bits of the transmit word comprise a character count indicating the number of characters stored in the transmit word. In state 10 the character count is examined and the sequencer advances to state 11 to read the character output buffer word if the count is equal to "0." Otherwise, the sequencer advances to state 14. In state 11 only one of the three characters obtained from the character output buffer word is gated into the CR Register 602; the remaining two characters are gated into the WR Register 603. From state 11 the sequencer next advances to state 13 where the address of the character output buffer word is again generated and all "1's" are written into the character output buffer word to indicate that it is empty. From state 13 the sequencer advances to state 14 where the two characters which were gated into the WR Register 603 in state 11 are written into the transmit word location in the Buffer Store 130 with a character count of 2.

If it is found in state 10 that the character count of the transmit word is equal to 1, the one character contained in the transmit word is gated into the CR Register 602 for subsequent transmission on the Line Facilities Bus 121 and the sequencing circuit advances to state 14. In state 14 the character count of 0 is then written into the transmit word. Similarly, if it is found in state 10 that the character count is equal to 2, one of the two characters is gated into the CR Register 602 in state 10 and the remaining character is written into the transmit word location with a character count of 1 in state 14.

When providing output service to Type C data line buffers, the Sequencing Circuit 620 transfers from state 1 to state 11 and then advances through states 12 and 13 to return to state 0. In state 11 the character output buffer word of the line identified by the line address in the LR Register 711 is read from the Buffer Store 130 and the buffer store address obtained therefrom is gated into the HR Register 604. In state 12 the contents of the HR Register 604 are employed to obtain from the Buffer Store 130 the output data word to be transmitted on the Line Facilities Bus 121. The obtained data word is gated into the CR Register 602 for subsequent transmission to the appropriate data line buffer. In state 13 the address in the HR Register 604 is incremented by 1 and the incremented address is written into the character output buffer word location, thereby storing the address of the next data word therein. After all 32 words of a data block have been thus obtained from the Buffer Store 130, all "1's" are written into the character output buffer word location. If upon reading the character output buffer word in state 11 it is found to be empty, the sequencer transfers to state 0 instead of advancing to state 12.

As indicated in the foregoing discussion, data is gated into the CR Register 602 in states 10, 11, and 12 for transmission on the Line Facilities Bus 121. After such data has been gated into the CR Register 602, a request is made by the Combining Gate Circuit 621 to the Priority and Control Circuit 413 for access to the Line Facilities Bus 121. When such access is granted, the contents of the LR Register 711 are gated to the Line Facilities Control Bus 411 and the DATA command is generated on the Line Facilities Control Bus 411 by the Combining Gate Circuit 621. The information on this bus is transmitted to the Line Facilities Bus 121 under control of the Priority and Control Circuit 413. The contents of the CR Register 602 are also transmitted on the Line Facilities Bus 121 under control of the Priority and Control Circuit 413. Such output operations to the Line Facilities 120 take place without affecting the operations of the Character Handling Circuit 117 except that the Sequencing Circuit 620 does not transfer to state 0 until after the output data has been transmitted on the Line Facilities Bus 121. Thus, the Sequencing Circuit 620 waits in state 13 or 14 until access has been granted by the Priority and Control Circuit 413.

DATA STORE CONTROL CIRCUIT 113

Figure 8:
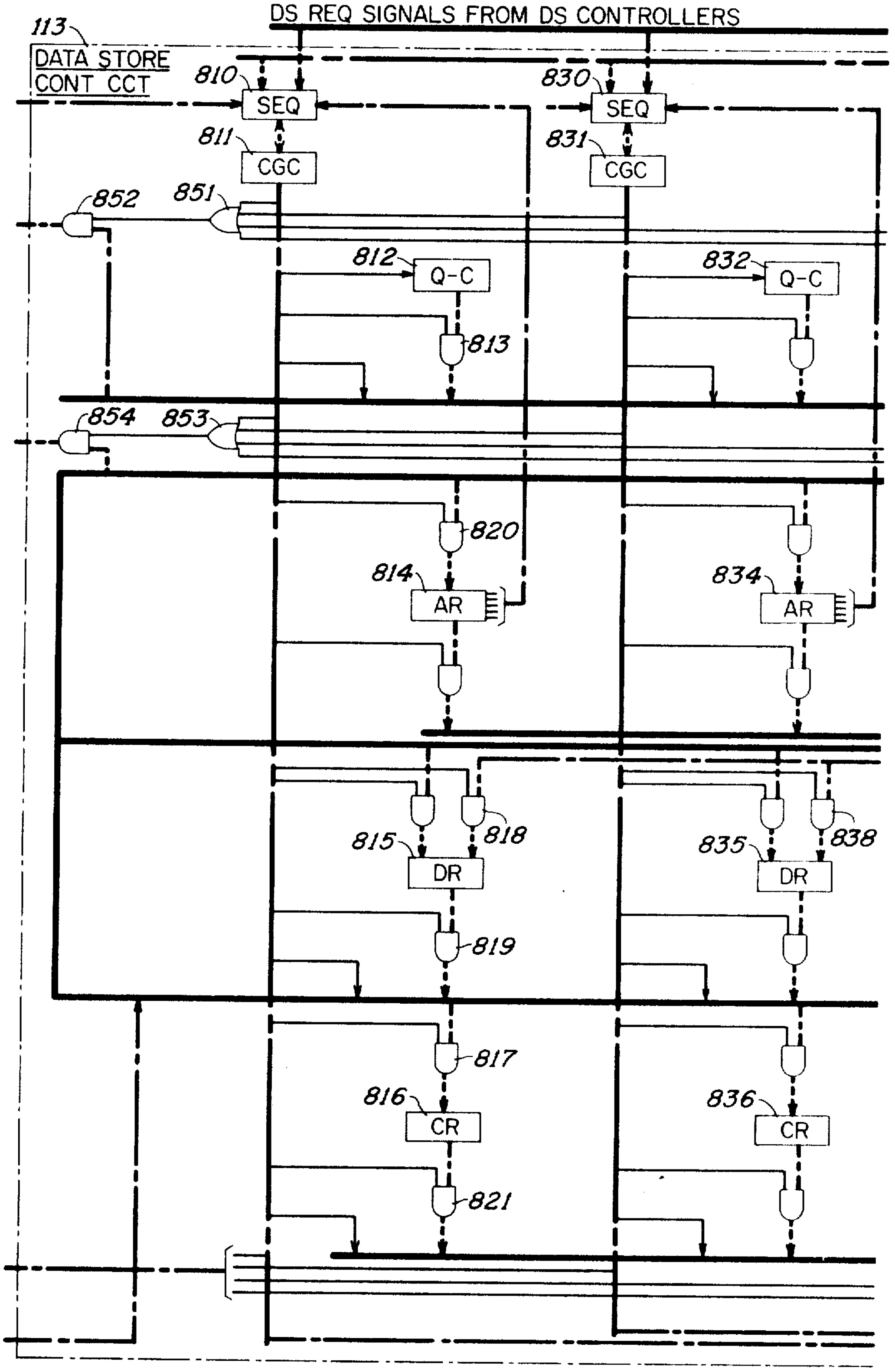
Figure 9:
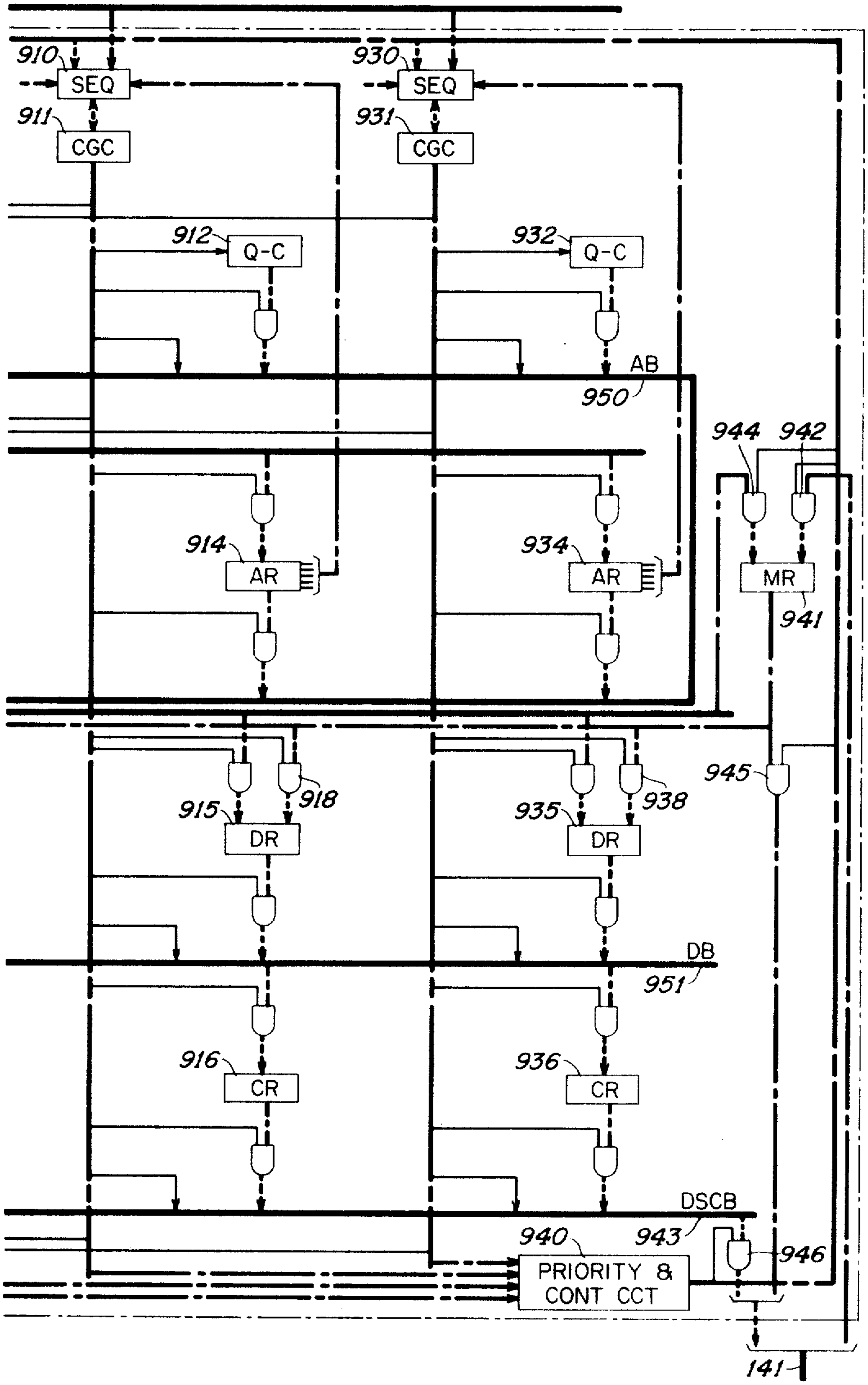

The Data Store Control Circuit 113 transfers data between the Buffer Store 130 and the disc and tape data storage units of the Data Store 140. As shown in FIG. 1, the Data Store 140 comprises Disc Controller A, Disc Controller B, Tape Controller A, and Tape Controller B, each having corresponding disc or tape files. The four controllers are interconnected with the Buffer Processor 110 by means of the Data Store Bus 141. Data is transferred between the Buffer Store 130 and Disc Controller A under control of Sequencing Circuit 810, Disc Controller B under control of Sequencing Circuit 830, Tape Controller A under control of Sequencing Circuit 910, and Tape Controller B under control of Sequencing Circuit 930. These sequencing circuits and other circuitry associated therewith are illustrated in FIGS. 8 and 9. Corresponding to each of the four sequencing circuits there exists in the Buffer Store 130 an instruction queue which comprises 16 control words and corresponding address words. The control words contain information defining the task to be performed (i.e., send data to or obtain data from the associated disc or tape controller), and information identifying the area of the disc or tape file involved. Each corresponding address word contains the address of a 32-word data block in the Buffer Store 130 from which data to be sent to the controller must be obtained or where data obtained from the controller must be stored. One control word and the corresponding address word is obtained from the queue by each sequencing circuit upon completion of a previous task. When a control word and the corresponding address word have been obtained from the Buffer Store 130, the entire task indicated by the control word (i.e., the transfer of a 32-word data block to or from the associated controller) is executed. A completion mark is written in the control word location by the sequencing circuit after the task specified therein has been completely executed. The control words of each of the four queues are periodically examined by the Central Processor 100 by means of the Transfer Control Circuit 111, and those control word locations in which a completion mark is found, are loaded with a new control word and a new address word is inserted in each of the corresponding address word locations.

Four Combining Gate Circuits 811, 831, 911, and 931 have been provided, one for each of the Sequencing Circuits 810, 830, 910, and 930 to generate control signals for controlling the circuitry associated with each sequencing circuit in accordance with the state output signals of the sequencing circuits. Four Q-Counters 812, 832, 912, and 932, which are 4-bit binary counters, have been provided for each of the Sequencing Circuits 810, 830, 910, and 930 and are employed in the generation of the addresses of the control words in the corresponding instruction queue. The 4-bit binary counter associated with a sequencing circuit is incremented each time a task has been completed by the sequencing circuit thereby causing the control words to be obtained sequentially in a circular manner, i.e., the first control word is obtained after the task defined by the 16th control word has been completed. Furthermore, four AR Registers 814, 834, 914, and 934 for storing the address of locations in the data blocks, four DR Registers 815, 835, 915, and 935 for storing data read from the data blocks or obtained from the associated controllers, and four CR Registers 816, 836, 916, and 936 for storing control word obtained from the queue have been provided for each of the sequencing circuits. The five least significant bits of each of the AR Registers 814, 834, 914, and 934 comprise a 5-bit binary counter which is incremented each time the data block is addressed thereby sequentially generating addresses of the locations within the data block.

Communications between the Buffer Store 130 and the Data Store Control Circuit 113 are controlled by the Priority and Control Circuit 710. Each of the Combining Gate Circuits 811, 831, 911, and 931 requests access to the Buffer Store Bus 131 when the corresponding sequencer is in a state wherein the Buffer Store 130 is to be addressed. Among the sequencing circuits of the Data Store Control Circuit 113 the Priority and Control Circuit 710 grants access in the following order: Sequencing Circuit 810, Sequencing Circuit 830, Sequencing Circuit 910, Sequencing Circuit 930. After access has been requested, the combining gate circuit which generated the request and the corresponding sequencing circuit are inhibited until access is granted. When access is granted, an address is gated to the Buffer Store 130 via the Address Bus 950 and the Buffer Store Control Buss 512. The address may originate from any of the four AR Registers 814, 834, 914, and 934, any of the four Q-Counters 812, 832, 912, and 932, or may be generated on the Address Bus 950 by one of the four Combining Gate Circuits 811, 831, 911, and 931. Data to be written into the Buffer Store 130 may be gated from any of the four DR Registers 815, 835, 915, and 935 to the Data Bus 951. From there the data is gated to the Buffer Store 130 via the BR Register 511. Data received from the Buffer Store 130 is gated into the appropriate one of the four DR Registers 815, 835, 915, and 935 via the BR Register 511 and the Data Bus 951.

The Data Store Bus 141 interconnects the four controllers of the Data Store 140 and the Buffer Processor 110. Controller identification information, control information (i.e., information specifying read or write, and file area identification information), and date to be stored on a disc or tape file is transmitted on this bus. Data read from the files is transmitted by the controllers on the same bus. The Priority and Control Circuit 940, which is similar to the previously discussed Priority and Control Circuit 710, allocates access to the Data Store Bus 141 in response to request signals from the combining gate circuits in accordance with a priority plan whereby Sequencing Circuit 810 gets first priority, Sequencing Circuit 830 gets second priority, Sequencing Circuit 910 gets third priority, and Sequencing Circuit 930 gets fourth priority. Each of the controllers transmits instruction request signals when ready to receive control information and data request signals when ready to receive or transmit data. Only the associated sequencer receives such signals from a controller. Control information and controller identification information is transmitted to a controller via the Data Store Bus 141 when the sequencer begins a new task, and after an instruction request signal is received from the corresponding controller. Control information to be transmitted to the Data Store 140 is gated from the appropriate one of the four CR Registers 816, 836, 916, and 936 to the Data Store Control Bus 943 under control of the corresponding combining gate circuits, and from there to the Data Store Bus 141 via symbolic AND gate 946 under control of the Priority and Control Circuit 940.

When, subsequent to the transmission of the control information, a data request signal is received, the controller identification information is again transmitted on the Data Store Bus 141. In case data is to be written on the corresponding disc or tape file, a data word is transmitted on the same bus in addition to the controller identification information. Data to be transmitted to the controller is gated from the appropriate one of the four DR Registers 815, 835, 915, and 935 to the MR Register 941 via Data Bus 951, under control of the corresponding one of the combining gate circuits. The data is subsequently gated to the Data Store Bus 141 under control of the Priority and Control Circuit 940. Data received from the Data Store Bus 141 also passes through the MR Register 941. The data is gated from the MR Register 941 to the appropriate one of the four DR Registers 815, 835, 915, and 935 under control of the corresponding sequencing circuit.

Figure 14:
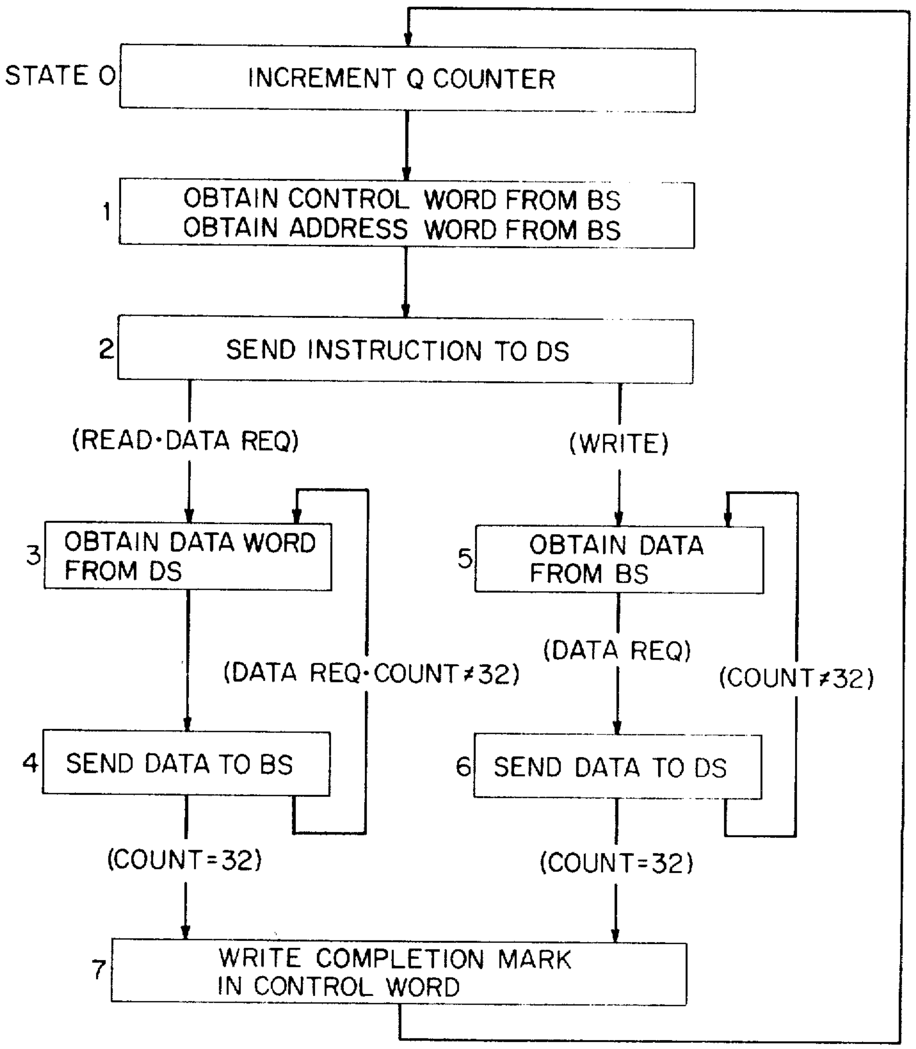
FIG. 14 is a flow diagram showing the operation of a representative one of four autonomously operating circuit arrangements which comprise the data store control circuit of this invention.
Figure 15:
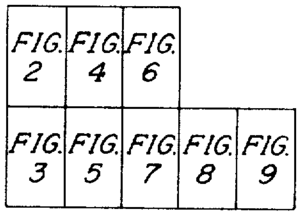
FIG. 15 is a key sheet showing the arrangement of FIGS. 2 through 9.

The various states which may be assumed by the sequencing circuits during execution of tasks defined by the control words are indicated in FIG. 14. The operation of the Sequencing Circuit 810 and its associated circuitry will now be described with reference to FIG. 14. The operations of the other sequencing circuits will not be described as these are substantially identical to that of Sequencing Circuit 810. As indicated in FIG. 14, the Q-Counter 812 is incremented in state 0. In state 1, the instruction queue is read to obtain a control word and a corresponding address word therefrom. When buffer store access is granted by the Priority and Control Circuit 710, the address of the control word of the queue is formed on the Address Bus 950 by gating the contents of the Q-Counter 812 to bits 1 through 4 thereof, by forcing fixed queue address information into the more significant bits, and by forcing a "0" in the least significant bit of the Address Bus 950. The address information is gated to the Buffer Store Control Bus 512 via AND gate 852 by activation of OR gate 851 from the Combining Gate Circuit 811. The control word read from the Buffer Store 130 is gated into the CR Register 816 via the BR Register 511 and the Data Bus 951. While in state 1, the address of the queue is transmitted a second time, this time with a "1" in the least significant bit, to obtain the address word which corresponds to the already obtained control word. The address word is stored in the AR Register 814. The Sequencing Circuit 810 remains in state 1 until an instruction request signal is obtained from Disc Controller A indicating readiness to receive an instruction. Upon receipt of such a signal, the Sequencing Circuit 810 advances to state 2 where the control information, stored in the CR Register 816, and controller identification information generated by the Combining Gate Circuit 811, are transmitted on the Data Store Bus 141 when access is granted by the Priority and Control Circuit 940. The Sequencing Circuit 810 advances from state 2 to state 3 if data is to be transferred from Disc Controller A to the Buffer Store 130, and to state 5 if data is to be transferred from Buffer Store 130 to Disc Controller A. However, the transition to state 3 does not take place until a data request signal has been received from Disc Controller A indicating readiness to transmit data. In state 3, controller identification information is generated by the Combining Gate Circuit 811 on the Data Store Control Bus 943 and transmitted on the Data Store Bus 141. A 23-bit data word extracted from the disc file by Disc Controller A, in accordance with the control information transmitted in state 2, is transmitted on the Data Store Bus 141 by Disc Controller A upon recognition of the identification information. The data word is received in the MR Register 941 and gated into the DR Register 815 via symbolic AND gate 818. The Sequencing Circuit 810 next advances to state 4 to store the data contained in the DR Register 815 in the Buffer Store 130 at the location defined by the address in the AR Register 814. The contents of the AR Register 814 are gated to the Buffer Store 130 via Address Bus 950 and the Buffer Store Control Bus 512. The contents of the DR Register 815 are transmitted to the Buffer Store 130 via Data Bus 951 and the BR Register 511.

When the count represented by the five least significant bits of the AR Register 814 reaches 32, a complete 32-word data block has been transferred. If, in state 4, the count is not equal to 32, the Sequencing Circuit 810 transfers from state 4 to state 3 when the next data request signal is received from Disc Controller A. Otherwise it advances to state 7. In state 3, controller identification is again transmitted to Disc Controller A to obtain the next data word therefrom. The new data word is again stored in the DR Register 815. In state 4, the count in the five least significant bits of the AR Register 814 is incremented by 1 and the newly received data word is stored in the Buffer Store 130 at the address defined by the incremented contents of the AR Register 814. In this manner, the Sequencing Circuit 810 loops through states 3 and 4 until all 32 words of a block have been obtained from Disc Controller A. When the count in the five least significant bits of the AR Register 814 equals 32, the Sequencing Circuit 810 advances to state 7. In state 7, the completion mark is written into the location in the instruction queue from which the control word defining the completed task was obtained. This is accomplished by gating the queue address of the control word and a 23-bit data word, having a "1" in the most significant bit of the word, to the Buffer Store 130. From state 7 the Sequencing Circuit 810 advances through state 0 to state 1 to obtain the next control and address words from the instruction queue.

When data is to be transferred from Buffer Store 130 to Disc Controller A, the Sequencing Circuit 810 advances from state 2 to state 5, instead of state 3. In state 5 the data word stored in the location defined by the address in the AR Register 814 is obtained from the Buffer Store 130 and stored in the DR Register 815. When a data request signal is received from Disc Controller A, the transition is made from state 5 to state 6 where controller identification information and the contents of the DR Register 815 are transmitted on the Data Store Bus 141. The Sequencing Circuit 810 transfers from state 6 to state 5 if the count in the five least significant bits of the AR Register 814 is not equal to 32, and to state 7 if it is equal to 32. In state 5 the count is incremented by 1 and new data is obtained. The loop through states 5 and 6 is repeated until the count of 32 is reached, indicating that all words of the data block have been transferred. In state 7, the completion mark is written into the queue. From state 7 the sequencer advances through state 0 to state 1 to obtain the next control word and address word from the queue.

TRANSFER CONTROL CIRCUIT 111

The Transfer Control Circuit 111 is responsive to commands received from the Central Processor 100 to either write information in the Buffer Store 130, or to read information from the Buffer Store 130. Such information may take the form of instruction and address words for one of the instruction queues, or scan control words, output data words, etc. Commands to which the Transfer Control Circuit 111 is intended to respond are transmitted on the Central Processor Memory Bus 101. The Transfer Control Circuit 111 monitors this bus by periodically gating information occurring on the bus into the AR Register 531 and decoding the information by means of Decoder 532. The Combining Gate Circuit 533 is responsive to outputs from the Decoder 532 and the Sequencing Circuit 534 to generate the signals necessary for the execution of the functions of the Transfer Control Circuit 111, such as the control of AND gates 544 through 550. Generally, an address defining a location in Buffer Store 130 accompanies the command received from the Central Processor 100. Such an address is gated into the AR Register 531 concurrently with the command. When the command to read the Buffer Store 130 is detected, the address is gated from the AR Register 531 to the Buffer Store Control Bus 512 via AND gate 548. The address is then transmitted to the Buffer Store 130 under control of the Priority and Control Circuit 710. The information read from the Buffer Store 130 is gated into the DR Register 535 via AND gate 547. In the immediately succeeding machine cycle the information is gated from the DR Register 535 to the Central Processor Memory Bus 101 via AND gate 550. When the command to write into the Buffer Store 130 is received, the information to be written is transmitted on the Central Processor Memory Bus 101 in addition to the command and the address. As before, the command and address are gated into the AR Register via AND gate 545, while the information to be entered in the Buffer Store 130 is gated into the DR Register 535 via AND gate 546. Subsequently, the address is gated to the Buffer Store 130 via the Buffer Store Control Bus 512 and the information is gated from the DR Register 535 to the Buffer Store 130 via the Buffer Store Write Bus 702.

As mentioned earlier, the data hopper is an area in the Buffer Store 130 comprising 1,024 locations in which input data and line addresses are written by the Character Handling Circuit 117. The data hopper is unloaded by means of the Transfer Control Circuit 111 upon command from the Central Processor 100. No address accompanies such a command. Instead, the address is derived from the Hopper Read Counter 536. Therefore, when a command to obtain information from the data hopper is detected, AND gate 544 is activated instead of AND gate 548 and the contents of the Hopper Read Counter 536 are gated to the Buffer Store 130 via the Buffer Store Control Bus 512. The counter is incremented, under control of the Combining Gate Circuit 533, each time the hopper is read, thereby generating the address of the next hopper location to be unloaded. Data read from the hopper is received in the DR Register 535 and transmitted to the Central Processor 100, as is all other data read from the Buffer Store 130 by means of the Transfer Control Circuit 111.

It is to be understood that the above-described arrangement is merely illustrative of the application of the principles of the invention; numerous other arrangements may be devised by those skilled in the art without departing from the spirit and scope of the invention.

What we claim is:

1. A data processing system comprising:

a plurality of data lines;

buffer means connected to said lines for recording line status information defining the functional activity of said lines and for storing input and output data associated with each of said lines;

a data processor comprising first control means for generating and transmitting address signals to said buffer means to obtain said line status information and said input data from said buffer means, and second control means, responsive to signals generated by said first control means and operating contemporaneously with said first control means, for processing said input data, and for transmitting said output data to said buffer means in accordance with said line status information.

2. A data processing system in accordance with claim 1 wherein said data processor further comprises access control means for controlling access to said buffer means and for selectively allocating such access to said first and said second control means in accordance with a defined priority plan.

3. A data processing system in accordance with claim 1 wherein said first control means comprises means for generating a first control signal in accordance with said obtained line status information; and wherein said second control means comprises means responsive to said first control signal to commence said processing and transmitting of data and means for generating a second control signal upon the commencement of said processing and transmitting of data;

said first control means comprising means responsive to said first control signal to halt said transmission of address signals to said buffer means and responsive to said second control signals to resume said transmission of address signals, said first control means generates and transmits address signals during periods of time in which said second control means independently processes said input data and transmits said output data.

4. A data processing system in accordance with claim 3 wherein:

said first control means further comprises means for generating line identification numbers in accordance with said line status information, and first register means for storing: said line identification numbers, buffer address information corresponding to said transmitted address signals, and input data obtained from lines defined by said identification numbers; and said second control means comprises second register means and means responsive to said first control signal for transferring said line identification numbers, said buffer address information, and said input data from said first register means to said second register means.

5. A data processing system in accordance with claim 3 wherein:

said line status information comprises line identification numbers;

said first control means further comprises first register means for storing: said line identification numbers, buffer address information corresponding to said transmitted address signals, and input data obtained from lines defined by said identification numbers; and said second control means comprises second register means and means responsive to said first control signal for transferring said line identification numbers, said buffer address information, and said input data from said first register means to said second register means.

6. A data processing system in accordance with claim 1 wherein:

said plurality of data lines comprises lines (Type A) having a low data transmission rate and lines (Type C) having a relatively higher data transmission rate;

certain of said buffer means are associated with said lines having said low data rate and are responsive to certain of said address signals, and others of said buffer means are associated with said lines having said relatively higher data rate and are responsive to others of said address signals; and said first control means comprises means for periodically interrupting the generation and transmission of said certain address signals and for initiating transmission of said other address signals.

7. A data processing system in accordance with claim 1 wherein:

said plurality of data lines comprises lines (Type A) having a first data rate, lines (Type B) having a second data rate, and lines (Type C) having a third data rate;

said buffer means comprise first, second, and third buffer means uniquely associated with said lines having said first, second, and third data rates respectively, said first, second, and third buffer means being responsive to first, second, and third address signals respectively; and said first control means comprises:

means for generating first and second timing signals, means for interrupting the generation and transmission of said first and said second address signals and for initiating the generation and transmission of said third address signals in response to said first timing signals, and means for generating completion signals upon completion of the transmission of a specified number of third address signals in an uninterrupted sequence, said means for interrupting being responsive to said completion signals and said second timing signals to selectively generate and transmit said first and said second address signals.

8. A data switching system comprising:

a plurality of data lines;

buffer means connected to said lines for recording line status information defining the functional activity of said lines and for storing input and output data associated with each of said lines;

first memory means;

second memory means;

a main processor comprising means for generating and transmitting command signals;

an auxiliary processor comprising:

first circuit means responsive to said command signals for transferring data between said main processor and said first memory means, second circuit means for transferring data between said first memory means and said second memory means, third circuit means for transferring data between said buffer means and said first memory means, and access control means for controlling access to said first memory means and for selectively allocating such access to said first, second, and third circuit means in accordance with a defined priority plan.

9. A data switching system in accordance with claim 8 wherein said second circuit means comprises a plurality of transfer control means and a plurality of register means uniquely associated with said transfer control means, said plurality of transfer control means operating concurrently to control the transfer of data between said associated register means and said first memory means and between said associated register means and said second memory means, said third circuit means further comprising access control means for controlling access to said second memory means and for selectively allocating such access to each of said plurality of transfer control means in accordance with a defined priority plan.

10. A data switching system in accordance with claim 8 wherein said third circuit means comprises first control means for generating and transmitting address signals to said buffer means to obtain said line status information and said input data from said buffer means, and second control means, responsive to signals generated by said first control means and operating concurrently with said first control means, for processing said input data, and for transmitting said output date to said buffer means in accordance with said line status information.

11. A data switching system in accordance with claim 10 wherein said third circuit means further comprises access control means for controlling access to said buffer means and for selectively allocating such access to said first and said second control means in accordance with a defined priority plan.

12. A data switching system in accordance with claim 10 wherein:

said plurality of data lines comprises lines having a first data rate, lines having a second data rate, and lines having a third data rate;

said buffer means comprises corresponding first, second, and third buffer means uniquely associated with said lines having said first, second, and third data rates, and responsive to first, second, and third address signals, respectively; and said first control means comprises:

means for generating first and second timing signals, means to interrupt the generation and transmission of said first and said second address signals and to initiate the generation and transmission of said third address signals in response to said first timing signals, and means for generating completion signals upon completion of generation and transmission of a specified number of said third address signals in sequence, said means for interrupting being responsive to said completion signals and said second timing signals to selectively generate and transmit said first and said second address signals.

13. A data switching system in accordance with claim 10 wherein:

said first control means comprises means for generating a first control signal in accordance with said line status information;

said second control means comprises means responsive to said first control signal to commence said processing and transmitting of data, and means for generating a second control signal upon the commencement of said processing and transmitting of data; and said first control means further comprises means responsive to said first control signal to halt the transmission of said address signals, and responsive to said second control signal to resume the transmission of address signals, whereby said first control means generates and transmits address signals to said buffer means during periods of time in which said second control means processes said input data and transmits said output data.

14. A data switching system in accordance with claim 13 wherein:

said first control means further comprises means for generating line identification numbers in accordance with said line status information, and first register means for storing: said line identification numbers, buffer address information corresponding to said transmitted address signals, and input data obtained from lines defined by said identification numbers; and said second control means comprises second register means and means responsive to said first control signal for transferring said line identification numbers, said buffer address information and said system input data from said first register means to said second register means.

15. A message switching system comprising:

a plurality of data lines;

buffer means connected to said lines for recording line status information defining the functional activity of said lines and for storing input and output data associated with each of said lines;

first memory means;

second memory means;

a main processor comprising means for generating and transmitting command signals;

an auxiliary processor comprising:

first circuit means for transferring data between said main processor and said first memory means in response to said command signals, second circuit means comprising a plurality of transfer control means and a corresponding plurality of register means, said transfer control means operating contemporaneously to control the transfer of data between said corresponding register means and said first memory means and between said corresponding register means and said second memory means, and access control means for controlling access to said second memory means and allocating such access in accordance with a defined priority plan, third circuit means comprising first control means for generating and transmitting address signals to said buffer means to obtain line status information and said input data therefrom, second control means, responsive to signals generated by said first control means and operating contemporaneously with said first control means, for processing said input data and for transmitting said output data to said buffer means, and access control means for controlling access to said buffer means and for allocating such access to said first and said second control means in accordance with a defined priority plan, timing means for supplying a plurality of timing pulses to said first, second, and third circuit means, and access control means for controlling access to said first memory means and for allocating such access to said first, second, and third circuit means in accordance with a defined priority plan.

16. A message switching system in accordance with claim 15 wherein said first control means comprises means for generating a first control signal in accordance with said line status information; and wherein said second control means comprises means responsive to said first control signals to commence said processing and transmitting of data, and means for generating second control signals upon the commencement of said processing and transmitting of data;

said first control means comprising means responsive to said first control signal to halt the transmission of address signals, and to said second control signals to resume transmission of address signals, said first control means generates and transmits address signals during periods of time in which said second control means processes said input data and transmits said output data.

17. A message switching system in accordance with claim 16 wherein:

said first control means further comprises means for generating line identification numbers in accordance with said line status information, and first register means for storing: said line identification numbers, buffer addresses corresponding to said transmitted address signals, and said input data; and said second control means comprises second register means and means responsive to said first control signal for transferring said line identification numbers, said buffer addresses, and said system input data from said first to said second register means.

18. A message switching system in accordance with claim 15 wherein:

said plurality of data lines comprises lines (Type A) having a first data rate, lines (Type B) having a second data rate, and lines (Type C) having a third data rate;

said buffer means comprises corresponding first, second, and third buffer means associated with said lines and responsive to first, second, and third address signals, respectively;

said first control means comprises:

means for generating first and second timing signals, and means for interrupting the generation and transmission of said first and said second address signals and for initiating the generation and transmission of said third address signals in response to said first timing signals, and means for generating completion signals upon completion of transmission of a specified number of said third address signals, said interrupting means being responsive to said completion signals and said second timing signals to selectively generate and transmit said first and said second address signals.

19. In combination:

a plurality of data signal sources adapted to generate status signals representing the functional activity of said sources, memory means for storing a plurality of control words at predetermined address locations, register means for storing information representing the memory addresses defining said predetermined address locations, timing means for generating timed interrupt signals, scan control means responsive to said timed interrupt signals to obtain control words from memory locations defined by said memory addresses and to scan said sources in accordance with said obtained control words, to determine the functional activity of the sources defined by said control words, and means responsive to said timed interrupt signals for selectively altering the contents of said register means.

20. In combination:

a data processor, a plurality of data handling devices connectable to said data processor, each of said devices being adapted to transmit input data to said data processor and to receive output data from said data processor in response to stimulation signals, first control means in said data processor for generating and transmitting said stimulation signals and for receiving said input data, and second control means, responsive to signals from said first control means and operating contemporaneously with said first control means, for processing said input data and transmitting said stimulation signals and said output data.